US012784100B2

(12) United States Patent
Bonig et al.

(10) Patent No.: US 12,784,100 B2
(45) **Date of Patent: *Nov. 3, 2026**

(54) SYSTEMS AND METHODS FOR COORDINATING PROCESSING OF INSTRUCTIONS ACROSS MULTIPLE COMPONENTS

(71) Applicant: Chicago Mercantile Exchange Inc., Chicago, IL (US)

(72) Inventors: Zachary Bonig, Skokie, IL (US); Eric Thill, Naperville, IL (US); Pearce Peck-Walden, Chicago, IL (US); José Antonio Acuña-Rohter, Des Plaines, IL (US); Barry Galster, Chicago, IL (US); Neil Steuber, Evanston, IL (US); James Bailey, Hanover Park, IL (US); Jake Siddall, Chicago, IL (US)

(73) Assignee: Chicago Mercantile Exchange Inc.

( * ) Notice: Subject to any disclaimer, the term of this patent is extended or adjusted under 35 U.S.C. 154(b) by 48 days.

This patent is subject to a terminal disclaimer.

(21) Appl. No.: 18/811,446

(22) Filed: Aug. 21, 2024

(65) Prior Publication Data

US 2024/0412290 A1 Dec. 12, 2024

Related U.S. Application Data

(63) Continuation of application No. 18/144,677, filed on May 8, 2023, now Pat. No. 12,094,002, which is a (Continued)

(51) Int. Cl.
*G06Q 40/00* (2023.01)
*G06F 9/30* (2018.01)
(Continued)

(52) U.S. Cl.
CPC ......... *G06Q 40/04* (2013.01); *G06F 9/30043* (2013.01); *G06Q 20/00* (2013.01)

(58) Field of Classification Search
CPC ............................ G06F 9/30043; G06Q 20/00
(Continued)

(56) References Cited

U.S. PATENT DOCUMENTS 6,065,108 A * 5/2000 Tremblay .............. G06F 9/3017 712/201
7,636,703 B2 12/2009 Taylor
(Continued)

FOREIGN PATENT DOCUMENTS

WO 2008/154306 12/2008
WO 2011/134975 11/2011
WO 2012/079041 6/2012

OTHER PUBLICATIONS

"High Performance Trading—Deployment of Leading Edge Technology Thinking", Argon Design, 2 pages, 2013.
(Continued)

*Primary Examiner* — Hai Tran
(74) *Attorney, Agent, or Firm* — Lempia Summerfield Katz LLC

(57) ABSTRACT

The disclosed embodiments relate to implementation of a trading system or trading system architecture having multiple transaction processors that process or execute instructions. The instructions are sent to the transaction processors before they are to be executed, so that when an instruction identifier corresponding to a pre-sent or pre-loaded instruction is sent to a transaction processor, the transaction processor can retrieve and execute the corresponding instruction without unnecessary delay, thus reducing transaction processing latency and improving computing efficiency.

25 Claims, 11 Drawing Sheets

Related U.S. Application Data continuation of application No. 17/169,678, filed on Feb. 8, 2021, now Pat. No. 11,688,007, which is a continuation of application No. 15/232,224, filed on Aug. 9, 2016, now Pat. No. 10,943,297.

(51) Int. Cl.

| | |
|---|---|
| ***G06Q 20/00*** | (2012.01) |
| ***G06Q 20/10*** | (2012.01) |
| ***G06Q 40/04*** | (2012.01) |
| ***G06Q 40/06*** | (2012.01) |

(58) Field of Classification Search
USPC .......................................................... 705/37
See application file for complete search history.

(56) References Cited

U.S. PATENT DOCUMENTS

| | | | | |
|---|---|---|---|---|
| 7,840,482 | B2 | 11/2010 | Singla et al. | |
| 7,921,046 | B2 | 4/2011 | Parsons et al. | |
| 7,954,114 | B2 | 5/2011 | Chamberlain et al. | |
| 8,069,102 | B2 | 11/2011 | Indeck et al. | |
| 8,407,122 | B2 | 3/2013 | Parsons et al. | |
| 8,458,081 | B2 | 6/2013 | Parsons et al. | |
| 8,548,900 | B1 | 10/2013 | Glackin et al. | |
| 2005/0149428 | A1* | 7/2005 | Gooch | G06Q 40/04 705/37 |
| 2007/0174841 | A1* | 7/2007 | Chamberlain | G06F 9/3879 719/310 |
| 2008/0126853 | A1* | 5/2008 | Callaway | G06F 11/1641 714/13 |
| 2008/0243675 | A1* | 10/2008 | Parsons | G06Q 40/04 705/37 |
| 2009/0182683 | A1 | 7/2009 | Taylor et al. | |
| 2009/0287628 | A1* | 11/2009 | Indeck | G06F 16/24544 706/47 |
| 2010/0241758 | A1 | 9/2010 | Oddie et al. | |
| 2010/0332650 | A1 | 12/2010 | Aisen | |
| 2011/0145447 | A1 | 6/2011 | Dimond | |
| 2011/0178911 | A1 | 7/2011 | Parsons et al. | |
| 2011/0178912 | A1 | 7/2011 | Parsons et al. | |
| 2011/0178917 | A1 | 7/2011 | Parsons et al. | |
| 2011/0178918 | A1 | 7/2011 | Parsons et al. | |
| 2011/0178919 | A1 | 7/2011 | Parsons et al. | |
| 2011/0178957 | A1 | 7/2011 | Parsons et al. | |
| 2011/0179050 | A1 | 7/2011 | Parsons et al. | |
| 2011/0184844 | A1 | 7/2011 | Parsons et al. | |
| 2011/0264578 | A1 | 10/2011 | Chapman et al. | |
| 2011/0320335 | A1 | 12/2011 | Gorelik et al. | |
| 2012/0089496 | A1 | 4/2012 | Taylor et al. | |
| 2012/0089497 | A1 | 4/2012 | Taylor et al. | |
| 2012/0095893 | A1 | 4/2012 | Taylor et al. | |
| 2012/0246052 | A1 | 9/2012 | Taylor et al. | |
| 2012/0259757 | A1 | 10/2012 | Nager | |
| 2012/0290460 | A1* | 11/2012 | Curry, Jr. | G06Q 30/08 705/37 |
| 2013/0030963 | A1* | 1/2013 | Cramer | G06Q 40/02 705/30 |
| 2013/0226764 | A1 | 8/2013 | Battyani | |
| 2014/0143121 | A1 | 5/2014 | Stevens | |
| 2014/0279342 | A1 | 9/2014 | Maynard | |
| 2014/0289094 | A1 | 9/2014 | Gaber et al. | |
| 2015/0127510 | A1* | 5/2015 | Studnitzer | G06Q 40/04 705/37 |
| 2015/0127513 | A1 | 5/2015 | Studnitzer | |
| 2015/0127516 | A1* | 5/2015 | Studnitzer | G06Q 40/06 705/37 |
| 2015/0193715 | A1* | 7/2015 | Bernath | G06Q 10/06316 705/7.26 |
| 2015/0199680 | A1* | 7/2015 | Framularo | G06Q 40/04 705/39 |

OTHER PUBLICATIONS

"Real-time Operating System", Wikipedia, 6 pages, http://en.wikipedia.org/wiki/Real-time_operating_System, Retrieved May 19, 2013.
"Solace Message Routers and Cisco Ethernet Switches: Unified Infrastructure for Financial Services Middleware", White Paper, 15 pages, 2010, Cisco Systems, Inc.
"What is a Real-Time Operating System (RTOS)?", National Instruments, 2 pages, Oct. 2, 2012.
Benjamin Geib, "Investigating Low Latency Trading with an HT Enabled FPGA", Universitat Heidelberg, 17 pages, Aug. 2, 2011.
C. Leber et al., "High Frequency Trading Acceleration Using FPGAs", International Conference on Field Programmable Logic and Applications, 317-322, 2011.
Cisco Systems, Inc., "Design Best Practices for Latency Optimization", 8 pages, 1992-2007.
Corvil, "Nanosecond Latency Management", Whitepaper, 10 pages, 2011.
International Preliminary Report on Patentability, from PCT/US2014/064001, May 10, 2016, WO.
International Search Report and Written Opinion from PCT/US2017/046082, Nov. 10, 2017, WO.
International Search Report and Written Opinion, from PCT/US2014/064001, Feb. 13, 2015, WO.
International Search Report in International Patent Application No. PCT/AU2009/000849, dated Aug. 6, 2009, 4 pages.
International Search Report in International Patent Application No. PCT/EP2011/056611, Jan. 20, 2012, 3 pages.
Leber et al., "How to Get World's Best Possible Ultra Low Latency in High Frequency Trading (Tick to Trade Method)", 2012.
Lockwood, et al., "A Low-Latency Library in FPGA Hardware for High-Frequency Trading (HFT)", 2012 IEEE 20th Annual Symposium on High-Performance Interconnects, pp. 9-16, 2012.
low-latency.com, "Groundbreaking Results for High Performance Trading with FPGA and x86 Technologies", Newswire, 2 pages, Sep. 25, 2013.
Risca et al., "Trading Floor Architecture", Cisco Systems, 36 pages, 2008.
Scott Caudell, "Co-location, Performance Management and Technology Innovation for Ultra-low Latency Trading", High Performance Technologies for Trading, Issue 5, 5 pages, Apr. 2010.
Tse et al., "High Frequency Trading—Measurement, Detection and Response", Trading Strategy, 12 pages, Dec. 6, 2012.
Tse et al., "High Frequency Trading—The Good, The Bad, and The Regulation", Trading Strategy, 7 pages, Dec. 5, 2012.
Wikipedia, "Real-time Business Intelligence", 4 pages, http://en.wikipedia.org/wiki/Real-time_business_intelligence, Retrieved May 19, 2013.

* cited by examiner 400 (106)

1000

SYSTEMS AND METHODS FOR COORDINATING PROCESSING OF INSTRUCTIONS ACROSS MULTIPLE COMPONENTS

CROSS REFERENCE TO RELATED APPLICATIONS

This application is a continuation under 37 C.F.R. § 1.53 (b) of U.S. patent application Ser. No. 18/144,677 filed May 8, 2023, now U.S. Pat. No. 12,094,002, which is a continuation under 37 C.F.R. § 1.53 (b) of U.S. patent application Ser. No. 17/169,678 filed Feb. 8, 2021 now U.S. Pat. No. 11,688,007, which is a continuation under 37 C.F.R. § 1.53 (b) of U.S. patent application Ser. No. 15/232,224 filed Aug. 9, 2016 now U.S. Pat. No. 10,943,297, the entirety of all of which are incorporated by reference herein and relied upon.

BACKGROUND

Computer systems commonly include multiple processing components. Many computer applications span multiple "tenants" (multi-threaded, multi-process, clustered, multi-data-center, etc.). The multiple components may receive the same operations or instructions to execute. Problems may arise if the order of operations between two processing components can differ, leading to different states for the two processing components.

To alleviate this, systems may run order-critical processes through a single system component, and then replicate the end state out to any redundant (backup) components. See, for example, U.S. Pat. No. 7,434,096 "Match server for a financial exchange having fault tolerant operation", U.S. Pat. No. 7,480,827 "Fault Tolerance And Failover Using Active Copy-Cat", and U.S. Pat. No. 8,041,985 "Match Server For A Financial Exchange Having Fault Tolerant Operation" herein incorporated by reference. However, this type of architecture may limit the maximum throughput of the system to the shortest time the single system component can process an operation and then replicate its state to its peer machines.

Moreover, computer systems may depend on time/temporal based/controlled coordination to attempt to ensure that multiple components perform events or operations at the same (real) time, or in the same order. However, computer system clocks are susceptible to drift where the clock of one computer/processor may operate at a different, i.e. faster or slower, rate than the clock of another computer/processor. Thus, it can become difficult to ensure that different components perform time-based tasks concurrently or in the same or desired order. Current technologies such as, for example, Precision Time Protocol (PTP), pulse per second signals, or Lamport timestamps, can compensate for such drift across multiple computers to a few hundred nanoseconds to a few milliseconds. This is sufficient for most computer operations.

In a financial exchange environment, however, the total time spent on processing an order is usually small enough (on the order of 100 microseconds), that the drift between computer systems may cause uncertainty. Systems within an exchange may require the current time as an input to process an order, such as opening the market for trading at a precise time or stopping matching on an expired futures contract. Furthermore, time may be used to discriminate among or otherwise arbitrate between near-simultaneously received transactions. In an active market, the incoming rate of orders can be high enough that the time drift between different system components may render the time difference between received transaction indistinguishable and cause the incoming customer requests to be processed in a different order than received by the various components. This may lead to non-deterministic behavior.

DETAILED DESCRIPTION

Figure 1:
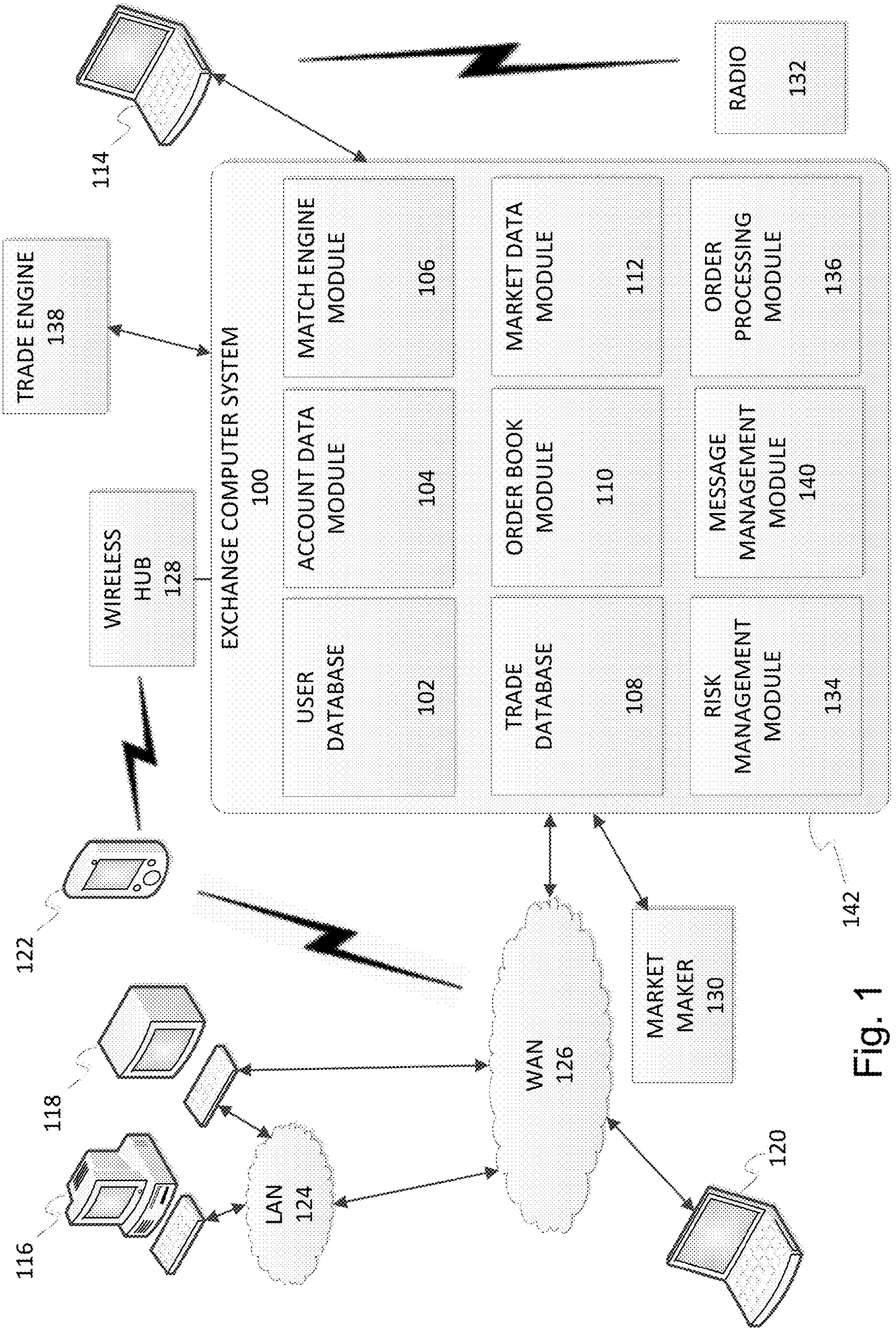
FIG. 1 depicts an illustrative electronic trading system that may be used to implement aspects of the disclosed embodiments.

A computer system may include multiple processing components that perform some (e.g., for process optimization and improved performance) or all (e.g., for fault tolerance) of the same tasks. The disclosed embodiments allow multiple systems or components to process tasks or instructions in a controlled, e.g., same or otherwise synchronized/coordinated, order. For example, the components may implement the disclosed systems to independently arrive at the same results based on a given set of inputs, e.g., to implement a deterministic system.

Multiple components may receive instructions/operations/tasks/transactions from multiple sources. The disclosed embodiments may generate both tasks and associated task identifiers, and send task identifiers through a single sequencer, so as to control the order, in a low latency manner, in which instructions are processed by components, even when the components receive instructions from multiple sources.

The tasks may be event based. Where the event is a time of day, the disclosed embodiments may include a time beacon that serves as a universal source of time for all of the system components. The system components accordingly may each receive a message indicating the time, and each component may perform a time-based task upon receiving the message indicating the corresponding time.

A system that allows such universal sequencing, including for event based (where the occurrence of a predetermined time may be an event) instructions, enables all system components to come to the same state or result. The disclosed embodiments also allow replay of transactions at a much later time, e.g., several weeks after processing transactions.

For example, multiple machines, e.g. computers or processors, in a system implementing the disclosed embodiments may receive the same stream of tasks or instructions in a different order, but the machine can nevertheless process the tasks in the same order, leading the machines to eventually reach or otherwise be able to maintain identical states once all the tasks are processed.

A financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

A market data feed, referred to as market data or market feed, is a compressed or uncompressed real time (with respect to market events), or substantial approximation thereof, data/message stream provided by the Exchange directly, or via a third party intermediary. A market data feed may be comprised of individual messages, each comprising one or more packets or datagrams, and may carry, for example, pricing or other information regarding orders placed, traded instruments and other market information, such as summary values and statistical values, or combinations thereof, and may be transmitted, e.g. multi-casted, to the market participants using standardized protocols, such as UDP over Ethernet. More than one market data feed, each, for example, carrying different information, may be provided. The standard protocol that is typically utilized for the transmission of market data feeds is the Financial Information Exchange (FIX) protocol Adapted for Streaming (FAST), aka FIX/FAST, which is used by multiple exchanges to distribute their market data. Pricing information conveyed by the market data feed may include the prices, or changes thereto, of resting orders, prices at which particular orders were recently traded, or other information representative of the state of the market or changes therein. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order on the order book to rest;

(2) The matching engine creates an update reflecting the opportunity and sends it to a feed engine;

(3) The feed engine multicasts it to all of the market participants to advertise the opportunity to trade;

(4) The market participants evaluate the opportunity and each, upon completion of their evaluation, may or may not choose to respond with an order responsive to the resting order, i.e. counter to the resting order;

(5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

To gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e. a causal, predictable, or otherwise expected, manner as understood and experienced by the market participants, i.e. the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term “transactional determinism” may refer to the processing, or the appearance thereof, of orders in accordance with the defined business rules.

In addition to efficiency, fairness and equity, electronic trading systems further provide significant performance improvements allowing for rapid high volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed. Throughput may be measured as the maximum number of orders or trades per second that the electronic trading system can support, i.e. receive and acknowledge, receive and match, etc.

Generally, market participants desire rapid market data updates, low latency/high throughput order processing, and prompt confirmations of their instructions to allow them to: competitively, frequently and confidently evaluate, react to, and capitalize upon or, conversely, avoid, discrete, finite, fast moving/changing or ephemeral market events; leverage low return transactions via a high volume thereof; and/or otherwise coordinate, or synchronize their trading activities with other related concerns or activities, with less uncertainty with respect to their order status. Higher volume capacity and transaction processing performance provides these benefits as well as, without detrimentally affecting that capacity or performance, further improves market access and market liquidity, such as by allowing for participation by more market participants, the provision of additional financial products, and/or additional markets therefore, to meet the varying needs of the market participants, and rapid identification of additional explicit and implicit intra- and inter-market trading opportunities. The Exchange benefits, for example, from the increased transaction volume from which revenue is derived, e.g. via transaction fees.

Current electronic trading systems already offer significant performance advantages. However, increasing transaction volumes from an increasing number of market participants, implementation by some market participants of algorithmic and/or high frequency trading methodologies whereby high speed computers automatically monitor markets and react, usually in an overwhelming manner, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access. For example, the increasing speed at which market participants may evaluate and respond to changes in market data, such as responsive to a market event, is increasing the rate at which transactions are received by the electronic trading system, narrowing the time of receipt gap there between and necessitating a need for a higher degree of discrimination so as to resolve the order in which those transactions are received, upon which the deterministic operation of the electronic trading system may be based, e.g. for order allocation, etc. Furthermore, the addition, by electronic trading systems, of additional channels of communication in an effort to increase capacity and opportunity, along with increased bandwidth of each channel, allows for more transactions to be submitted over multiple parallel paths into the system. Accordingly, not only must the electronic trading system discriminate among closely received incoming transactions, but must further arbitrate among transactions received simultaneously, or temporally so close together as to be considered simultaneously received, i.e. the difference in their time of receipt being too close to measure by the implemented discrimination mechanisms, also referred to as "substantially simultaneously".

In addition to increased capacity and lower latency, the global nature of business has further driven a need for fault tolerance to increase availability and reliability of electronic trading systems. Scheduled outages must be minimized and unscheduled outages must be eliminated.

Furthermore, to implement the Exchange's clearing function, which mitigates the concerns of market participants relating to performance by counter parties, protects the interests of the Exchange and otherwise adequately manages/mitigates risk, risk management systems having corresponding operational efficiency and performance are needed so as to protect the Exchange from loss while minimizing impediments to market operations or distractions to market participants with ancillary and unnecessary tasks. In addition, increased transaction volume may further translate into greater exposure for market participants requiring greater amounts of capital to be posted to cover losses. Accordingly, more accurate and/or tailored risk assessment may be required to ensure that only the necessary minimum amount of capital is required to be allocated by the market participants to cover potential losses and avoid undue encumbrances on/impediments to the ability of those market participants to conduct their business.

Improved speed and efficiency also, unfortunately, improves the speed at which problems may occur and propagate, or otherwise be exploited, such as where the market ceases to operate as intended, i.e. the market no longer reflects a true consensus of the value of traded products among the market participants. Such problems are typically, but not always, evidenced by extreme market activity such as large changes in price, whether up or down, over a short period of time or an extreme volume of trades taking place. In particular, market participants, whether human or electronic, may not always react in a rational manner, such as when presented with imperfect information, when acting in fraudulent or otherwise unethical manner, and/or due to faulty training or design. For example, while communications technologies may have improved, inequities still exist in both access to information and access to opportunities to participate, which may not be due to any violations of legislative, regulatory and/or ethical rules, e.g. some traders receive information before other traders because they can afford faster communications channels, some traders may be able to place trade orders more quickly than others because they have faster computers. In many cases, irrational and/or exploitive trader behavior may be triggered by a market event, such as a change in price, creating a feedback loop where the initial irrational reaction may then cause further market events, such as continued price drops, triggering further responses and resulting in an extreme change in the price of the traded product in a short period of time. High speed trading exacerbates the problem as there may be little time for traders/algorithmic trading systems, or those overseeing them, to contemplate and temper their reactions before significant losses may be incurred. Furthermore, improved communications among traders facilitates exploitation of information inequities and propagation of irrational behavior in one market to other markets as traders in those other markets react to the results of the irrational behavior. Market protection systems may therefore be needed to monitor and evaluate trading activity, detect illegitimate/exploitive activity and appropriately react more quickly to mitigate the spread of problems, again without impeding legitimate market operation.

Accordingly high performance electronic trading systems need to assure transactional determinism under increasing loads while providing improved trading opportunities, fault tolerance, low latency processing, high volume capacity, minimal impact risk mitigation and market protections, as well as equitable access to information and opportunities.

The disclosed embodiments relate to implementation of a trading system, which may also be referred to as a trading system architecture, having improved performance and which further assures transactional determinism under increasing processing transaction loads while providing improved trading opportunities, fault tolerance, low latency processing, high volume capacity, risk mitigation and market protections with minimal impact, as well as improved and equitable access to information and opportunities.

Underpinning the provisioning of these features is a need to improve transaction processing performance while also improving the volume of transactions which can be processed by the electronic trading system. Electronic trading systems, as will be described, are implemented using computer technology, e.g. processors, memories, electronic communications networks, and the like. As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"-somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To improve performance and volume, merely implementing existing systems using newer and faster general purpose technology may be insufficient. General purpose processors, operating systems and compilers implement general optimizations and operations designed to improve performance and reliability while maintaining broad applicability across a wide variety of applications. As such, these optimizations are not necessarily optimized for any one application, e.g. such as for implementing a match engine of an electronic trading system. These optimizations, which are largely defined by the manufacturer and may be out of the control of an application developer, may include interrupt handling algorithms, algorithms to improve multitasking, memory management algorithms, pre-fetching, branch prediction, program code optimizations, etc. However, such optimizations may, in fact, undermine the application for which the general purpose processor is being used. In particular, with respect to the business transactions processed by an electronic trading system, where transactional determinism is paramount, underlying optimizations may be disruptive thereof.

As described above, as used herein a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real time processing.

For example wherein the business rules define a first-in-first-out ("FIFO") process for matching offers with counter-offers to effect an exchange or trade, when an offer transaction is received to which no prior counter offer transaction has been previously received, it should be matched with the next suitable counter offer transaction received rather than a later received counter offer transactions. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g. market, or changes thereto, in which the business transactions are transacted should present an accurate reflection of the actual state or state change in accordance with the defined business rules, so as to not mislead participants or provide an unfair advantage. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith.

Additionally, a system transmitting or passing messages that are large or include a large volume of data may experience delays if the messages are all run through a single point/channel/link/port, which may be necessary to maintain sequencing/ordering of tasks or instructions. Moreover, as discussed above, clock drift, or differences in the clocks of different computers due to differing clock rates, can cause imprecision in a time-dependent system including multiple independent computers and/or components.

Generally, when the rate of business transaction processing is less than the underlying instructions processing capacity of the underlying general purpose processor, general performance optimizations implemented by the processor or operating system may be hidden or otherwise imperceptible at the transactional level. That is, the processor is able to perform these optimizations (e.g. page switches, instruction pre fetch, branch mis-predictions, cache miss processing, error/packet recovery) fast enough so as not to affect the executing business application. However, as the rate and volume of transactions increases, contention for internal processor resources, such as memory bandwidth, also increases. Accordingly, the impact of internal optimizations on the executing application may no longer be imperceptible. In a multiprocessor environment, this impact may affect the ability to maintain application tasks/processes, which are divided among multiple processors, in sync which each other which may result in out of order execution of one or more transactions.

Similarly, when the rate of business transaction processing among multiple processors does not exceed a tolerance by which the synchronization between the clocks of each processor may be allowed to drift, such drift may be hidden or otherwise imperceptible at the transactional level, e.g. synchronization of the processing of transactions is unaffected by the drift. However, as the rate and volume of transactions increases, individual transaction processing times may fall within the margin by which the clocks are out of sync, resulting in inconsistent processing results.

General purpose processors and operating systems further suffer from their general availability and applicability which has made them susceptible to being reverse engineered and compromised by unknown or uncorrected deficiencies or defects, particularly security related, making them vulnerable to hacking, viruses and other threats. Accordingly, firewalls or other security appliances, applications or protocols may be required to ensure the safety and security of such systems which further adds latency, degrades throughput or otherwise impedes performance.

Alternatively, the embodiments described below may be implemented using FPGA's or other reconfigurable logic. Implementing processing tasks and algorithms using an FPGA can yield significant performance enhancements over implementations using traditional microprocessors and operating systems. In particular, an FPGA based system implementation may avoid the processing overhead and uncontrollable/unnecessary optimizations implemented by general purpose processors, compilers, operating systems and communications protocols, as well as the security vulnerabilities thereof. For example, an FPGA may avoid interrupt handling, error correction, pre-fetching and other unnecessary microprocessor operations/optimizations, as well as generic processing/housekeeping tasks of the operating system which are not needed, such as garbage collection, unnecessary memory swaps, cache loads, task switching, cycle stealing, etc. Further an FPGA implementation may avoid the use of general purpose compilers which may introduce, for example, undesired program code optimizations.

For example, using an FPGA based implementation may permit components of a trading system to be collocated, such as via a custom interface, or otherwise closely interconnected with networking equipment, such as a router or switch, e.g. via a backplane thereof. This would allow the trading system to have access to incoming transactions as quickly as possible and avoid the latency introduced, not only by having to route the transaction over conventional networking media, but also by the communications protocols, e.g. Transport Control Protocol ("TCP"), used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable trading platform under the supervision of a host CPU. Under the Open System Interconnection ("OSI") model, which is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

However, increasing operating performance, whether via an improved general purpose processor or via an FPGA based implementation, may expose, or reduce tolerance of, fundamental flaws of traditional computer hardware, operating systems or the algorithms/programs implemented thereon, as well as network interconnects/communications media. Such flaws, which may result in non-deterministic operation, include manufacturing imperfections/variabilities (clock skew, long paths, Resistance/Capacitance ("RC") delay, alpha particles, etc.), susceptibility to environmental conditions or changes thereto (temperature, humidity, solar flares, etc.), and human error (intermittent or loose connections, improper configuration, etc.). These flaws may introduce transient errors, such as race conditions, clock skew, clock drift, bit errors or packet loss, which affect deterministic operation. These issue may be compounded in a multiprocessor (whether distributed or co-located, e.g. in the same room, the same box, the same package, or on the same substrate) environment, which is desirable for fault tolerance and/or improved performance, where clock synchronization is required to ensure deterministic operation as between processors, new interconnects and imperfections/variabilities are introduced/multiplied, interconnects are longer (increasing the occurrence of race conditions and/or jitter, i.e. variability over time of communications latency), coherence issues are introduced necessitating complex coherency management mechanisms (thread or resource locking, etc.), and resource (data, memory, bus) contention or conflicts may occur.

Furthermore, mere improvements to performance can reveal problems with the applications themselves, such as trading applications or their underlying algorithms. For example, an increase in the rate of transaction processing may cause variances/divergence, between actual operation and ideal or expected operation, to emerge, be amplified, exacerbated (possibly exploited) or compounded beyond an acceptable level, e.g. before the application can be reset or other corrective action taken. In particular, deficiencies with assumptions, e.g. factors thought to be negligible or at least acceptable, may become significant, such as the assumed requisite degree of precision or rounding, assumed number decimal places, assumed number of bits (which may cause overflow), assumed or limited precision constants or variables (e.g. a time variable incapable of nanosecond or other requisite precision), assumed clock boundaries, factors assumed to be constant which are in fact variable, variables ignored for convenience or to reduce complexity, trade-offs and compromises (made for convenience/to reduce cost/complexity or improve performance of the implementation). Further, the occurrence of unaccounted for, or intentionally ignored, assumed-statistically-insignificant events/factors, variables, rounding errors, synchronization errors, corner cases, rare or unexpected/unanticipated states or state transitions may present an increasing risk. Generally, speed becomes a lens which creates, or magnifies/reveals underlying, defects and/or divergences, e.g. where a later transaction may overtake an earlier transaction (race condition), as well as limits recovery time from, or otherwise reduces tolerance for, errors (transient or systemic (delay) such as bit errors, packet loss, etc.). Such flaws may cause inconsistencies and/or may be unfairly exploited.

Accordingly, beyond mere performance improvements, improved architectures and algorithms for implementing electronic trading systems may be needed to ensure proper, e.g. transactionally deterministic, operation by avoiding optimizations and operations which may undermine intended operation and avoid, account and/or compensate for performance related/introduced/revealed inadequacies.

The disclosed architecture, and implementations thereof, described in detail below, facilitate improved, e.g. low latency and high volume, transactional performance and fault tolerance with assured transactional determinism, while further enabling additional value added functionality to improve information outflow, trading opportunities, e.g. the ease with which trades can occur or liquidity, risk mitigation and market protections, as will be described below.

In the exemplary embodiments, all transactions are ultimately received at the electronic trading system via a single point of entry, i.e. a single communications interface, i.e., a transaction receiver which may be referred to as an "orderer", at which the disclosed embodiments apply determinism, which as described is moved away from the point where matching occurs and closer, physically and/or logically, to the point where the electronic trading system first becomes "aware" of the incoming transaction. This may require improving the performance of this communications interface to process the influx of transactions without being overwhelmed. In some implementations, more orders may be submitted by market participants via more parallel inputs/channels/communications pathways implemented to increase capacity and/or reduce resource contention. However, for many of the reasons described above, parallel communication paths complicate deterministic behavior, e.g. by creating opportunity, such a via asymmetric delays among communications paths, for later transmitted or arriving transactions to overtake earlier arriving or transmitted transactions, and may require mechanisms to discriminate among closely received transactions and arbitrate among simultaneously, or substantially simultaneously, received transactions, e.g. transactions received at the same time or received within a threshold of time unresolvable by the system. Accordingly, mechanisms may be implemented to improve and impart deterministic handling of discrimination and arbitration among closely received transactions.

In particular, in one embodiment, an architecture for an electronic trading system is disclosed. As will be described in more detail below with respect to FIG. 2, the architecture implements a set of match engines, which may be identical/redundant or different, or a combination thereof. For example, in one embodiment, they may be redundant to improve fault tolerance. This set of match engines may include two or more match engines, such as three or five match engines. Incoming transactions, e.g. orders to trade, are processed by an Orderer component, i.e., a transaction receiver, of the architecture which may augment each transaction with time signal data, or data indicative of a time of receipt or time or sequence indicative of a temporal or sequential relationship between a received transaction and other received transactions. The time signal data may be based on, for example, a system clock or the Orderer. The Orderer may additionally serialize, or otherwise sequence, the incoming transactions based on their order of receipt by the Orderer. In this manner, the Orderer is the point of determinism for the system as each transaction is augmented with an indicium, such as a time stamp or other sequence encoding, indicative of its order of receipt relative to the other received transactions, ensuring their ordered processing thereafter.

The sequenced transactions may then be substantially simultaneously communicated, e.g. broadcasted, to each match engine of the set of match engines, which may be intended to be redundant to each other, each of which then processes the transaction, based on the sequencing imparted by the orderer, and determines a result, referred to as a match event, indicative, for example, of whether the order to trade was matched with a prior order, or reflective of some other change in a state of an electronic marketplace, etc. As used herein, match events generally refer to information, messages, alerts, signals or other indicators, which may be electronically or otherwise transmitted or communicated, indicative of a status of, or updates/changes to, a market/order book, i.e. one or more databases/data structures which store and/or maintain data indicative of a market for, e.g. current offers to buy and sell, a financial product, described in more detail below, or the match engines associated therewith, and may include messages which are indicative of, or otherwise generated based upon:

REST—indicates that a new order has been placed on an order book but not matched with a previously received order counter thereto (this event may also be indicated by a series of price improvement match events or deep book change match events, which may both be considered rests);

FILL—indicates that a new incoming order matched with one or more previously received but unsatisfied orders which were resting on an order book resulting in a trade;

MOD—indicates that an existing/resting order's values (price, quantity, etc.) have been modified/changed;

CANCEL—indicates that an existing/resting order has been canceled/removed;

MARKET OPEN—indicates that a market for trading has opened;

MARKET CLOSE—indicates that a market for trading has closed;

MARKET HALT—indicates that a market for trading has been paused for some period of time due to internal restrictions (usually that price velocity has gotten too high);

NEW PRODUCT—indicates that a new product is available;

CLOSE/CANCEL PRODUCT—indicates that a product is removed from trading;

PRODUCT TRANSITION—indicates that the market for a product is transitioning state, e.g. opening, closing, pausing, or reserving;

TRADING SCHEDULES—indicates the market hours;

FIRST TRADE—indicates that a first trade for a product has been placed;

PRODUCT LIMITS—indicates the price limits for a product;

TRADE—indicates that a trade for a particular product has occurred;

BUST—indicates that a trade has been invalidated;

RFQ—indicates a request for quote, e.g. a request to send in orders for a particular product;

HEARTBEAT—indicates an administrative message of the electronic trading system used to ensure communications of market events are functioning properly;

or other event or status.

In one embodiment, even though the match engines may process the same financial transactions, each match engine may generally operate asynchronously with respect to the remaining match engines simplifying the implementation thereof, i.e. without complex interconnection or synchronization there between. Where the system is designed for the match engines to be redundant, the Decider, discussed below, may look for consistency in the results output of the match engines. If however the match engines are not intended to be redundant to each other, the results may not be compared or checked for consistency. Whether or not the results are desired to be identical or not may be an implementation feature. In one embodiment, the match engines may all attempt to process the same financial transaction in the same way, such that at any given moment, the match engines are synchronized.

As each match engine generates its result/match event, that result/match event is communicated to a Decider component of the architecture. The Decider collects the results/match events from at least a subset of the set of match engines and determines, of the received results, which is the correct result. In one embodiment, this determination may be based on a defined quorum vote, i.e. minimum number of match engines whose results must agree. This quorum may be a majority or super-majority of the match engines. The determined result/match event may then be provided to a market data component, for example, which updates data records, e.g. an order book, reflective of the match event and/or otherwise reports the match event to the market participants involved in the transaction, as well as the market as a whole, as will be described.

The Orderer component may also receive administrative instructions intended for the match engines. Thus, the Orderer, e.g., transaction receiver 210, may receive messages intended for the match engines, e.g., transaction processors 208, including instructions and transactions from multiple sources. For example, the transaction receiver 210 receives financial transactions from market participants which are sent to the transaction processors 208, and also receives administrative instructions from administrative systems 216 which are also sent to the transaction processors 208.

Moreover, each match engine, which may be implemented as a transaction processor, may receive a set of instructions independent of the financial transaction messages and administrative instructions, and may be configured to execute such instructions at a scheduled time. The scheduled instructions may be received, for example, by an administrator of the exchange computing system that includes the multiple transaction processors, i.e., the multiple match engines. In one embodiment, the administrative systems 216 may send administrative instructions that are both scheduled (i.e., intended to occur at a predetermined time) and un-scheduled to the match engines.

The scheduled instructions may include instructions to cause a processor to perform at least one of: garbage collection; start processing financial transactions; stop processing financial transactions; update software for the transaction processor; enable the processing of financial transactions; disable the processing of financial transactions.

In one embodiment, where the transaction processors are implemented as match engines, starting and stopping processing of financial transactions may include opening and closing an electronic marketplace for a financial product, respectively.

In the case where the match engines are purposed to perform the same set of operations, each match engine may receive the same set of scheduled instructions, with the intention or desire that the match engines perform those scheduled instructions simultaneously, e.g., at the actual same time, or as close to it as possible, or in a coordinated manner, and in the same sequence with respect to the financial transaction messages. To this end, each scheduled instruction may include scheduled time data when the instruction should be executed. Each match engine may be configured to process or execute the scheduled instructions based on the time signal data augmented to each incoming financial transaction. The match engines may accordingly process the scheduled instructions based on, or relative to, a separately provided reference clock/clock time signal, e.g., time signal data which is augmented to each received message by the orderer.

Thus, in one embodiment, the system may execute previously received, scheduled instructions upon receiving a message including corresponding time signal data that is augmented to each incoming financial transaction. The receipt of a message including time signal data that corresponds to scheduled time data stored within previously received, scheduled instructions thus may act as a trigger for the match engines to execute the corresponding scheduled instructions.

The time signal data augmented to each incoming message may be in the same units as the scheduled time data included in the scheduled instructions. Thus, the match engine can readily compare the time signal data to the scheduled time data and determine whether the time signal data and the scheduled time data correspond to each other.

Accordingly, fault tolerant operation may be achieved via the match engines coupled with the Decider component which coalesces the results therefrom while deterministic operation is preserved via the sequencing of transactions by the Orderer component. Further, maintenance may be simplified by allowing faulty match engines to be reset or otherwise swapped out without impeding the processing of transactions. In addition, processing tasks, such as housekeeping tasks, e.g. garbage collection, which the processor implementing a match engine must periodically perform and which may impede that match engine's ability to process transactions, may be tolerated. Indeed, such tasks may be the scheduled or unscheduled administrative instructions referenced above. For example, a set of redundant match engines may be designed such that only one match engine at a time may perform such housekeeping or administrative tasks, while the remaining match engines continue to process transactions as usual. This may be implemented by transmitting a directive or administrative transaction to all of the match engines injected into the transaction stream, such as by an administrative component, e.g., Administrative Systems 216, coupled therewith. The directive/administrative transaction may act as a synchronizing transaction and/or a direction to instruct each match engine when to perform its housekeeping/maintenance tasks. The Decider component, via its normal operation as was described, may then ignore the lack of a result/match event from the particular match engine allowed to perform its housekeeping tasks, assuming it has received results from a sufficient number of the remaining match engines. In one implementation, the Decider may be further operative to determine when a match engine becomes non-responsive or otherwise faulty. In this embodiment, the threshold for determining a non-response match engine may be set to a value that is greater than the time it would take a match engine to perform its housekeeping tasks to avoid identifying that match engine as non-responsive. Once determined to be faulty, the match engine could then be removed from the quorum wherein the Decider evaluates and determines the result based on the results received from the remaining match engines using a modified quorum value, i.e. a lesser number of concurring results, to determine the correct result. It will be appreciated that the faulty match engine could then be rebooted, reinstated, restarted or otherwise replaced with the Decider then restoring full operation therewith.

As was described above, the Orderer component, by the nature of its role to sequence transactions for subsequent processing, may be designated the de facto point of determinism, alone or in concert with the network infrastructure which directs transactions thereto, for the system as, based on when it perceives receipt of transactions, defines the order in which those transactions will be further processed. Accordingly, it may be desirable to locate the Orderer close to the point at which transactions ingress, or are otherwise received by, the electronic trading system. In one implementation, the Orderer is implemented using an FPGA coupled, or otherwise integrated with, the network switch/gateway into which transactions are received from sources external to the electronic trading system. This allows the Orderer to receive transactions as quickly as possible, such as by bypassing the typical network hardware and software infrastructure. The network switch/gateway may then be further coupled with the set of match engines, which may be redundant to each other, allowing the Orderer to quickly communicate the sequenced transactions thereto.

Similarly, it may be further advantageous to report match events to market participants as quickly as possible. Accordingly, in one embodiment, the Decider may also be implemented in an FPGA, either the same as or different from the FPGA in which the Orderer is implemented, also coupled with the network switch/gateway which couples the electronic trading system with the external infrastructure that interconnects with the market participants. In this manner, match events can be communicated out of the electronic trading system as quickly as possible.

It will further be appreciated that to increase fault tolerance of the electronic trading system, the entire architecture, i.e. orderer, redundant match engines and decider, which may be collectively referred to as a "match engine quorum," may also be replicated in a redundant manner.

In another embodiment, an improved market monitoring system, also referred to as direct market instrumentation, is provided which facilitates activity/transactional-level resolution recording of the operation of the entire electronic trading system. The disclosed market monitoring system leverages the unique perspective of being able to monitor the state of the entire market and the activities of all market participants to enable: monitoring of market activity, e.g. transactions and other actions undertaken by market participants, administrators, regulators and other participating entities which affect the state of the market, including both inter- and intra-market participant activity; derivation of market and market participant metrics; identification and monitoring of transactional patterns which may be indicative of, or portend market events, such as a market crash, or illegal, fraudulent or malicious activity; and/or post event replication/replay, inspection and analysis of market events and the activity leading thereto. In one implementation, the market monitoring system is implemented in an FPGA having a memory and coupled with the transaction ingress point of the electronic trading system, such as the Orderer, described above, or an order entry gateway of a single match engine-based trading architecture. By utilizing an FPGA having an onboard memory, rapid data transfers can be achieved to copy and store transactions in the memory as they are received. Rather than preserving only snapshots of market activity or significant state changes in the market, a complete transactional record enables the ability to replay that activity and recreate desired market states, perform event driven and/or real time analysis, as well as analyze the activity at a later time to derive metrics and look for patterns. Further, simulation and testing of hypothetical scenarios may be enabled by allowing for synthetic activity to be created and executed, as well as allow recorded activity to be modified, such as by changing the parameters of one or transactions, to discern how the modified activity affects the resultant market state.

As used herein, a financial message or financial data message may refer both to messages communicated by market participants to an electronic trading system and vice versa. Financial messages communicated to the electronic trading system, also referred to as "inbound" messages, may include request messages, such as trader orders, order modifications, order cancellations and other transaction requests, as well as other message types. Financial messages communicated from the electronic trading system, referred to as "outbound" messages, may include messages responsive to inbound messages, such as confirmation and/other response messages, or other messages such as market update messages, quote messages, and the like, e.g. market data messages.

Financial messages may further be categorized as having or reflecting an impact on a market, also referred to as an "order book" or "book," for a traded product, such as a prevailing price therefore, etc., or not having or reflecting an impact on a market or a subset or portion thereof. For example, a request to place a trade may result in a response indicative of the trade either being matched with, or being rested on an order book to await, a suitable counter-order. In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein. It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. For example, a particular market data feed may only communicate information related to the top buy/sell prices for a particular product, referred to as "top of book" feed. In this case, a request message may be considered market-impacting only if it affects the top buy/sell prices and otherwise is considered non-market-impacting. As market impacting communications tend to be more important to market participants then non impacting communications, this separation may reduce congestion and or noise among those communications having or reflecting an impact on a market or portion thereof.

Market data feeds may further be characterized as providing a "view" or "overview" of a given market, an aggregation or a portion thereof. For example, a market data feed may convey the entire state of a market for a particular product, e.g. all presently resting buy/sell orders and prices associated therewith as well as trade notifications, etc., only a portion of a market, e.g. only the top 10 resting buy/sell orders, and/or an aggregation of multiple markets or portions thereof. As used herein, a market impacting request may be said to impact the "view" of the market as presented via the market data feed.

Various types of market data feeds may be provided by electronic trading systems, such as the CME, in order to provide different types or subsets of market information or to provide such information in different formats. Examples include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index). It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available of later developed, are contemplated herein.

In another embodiment, customized market data feeds are provided allowing market participants to specify a customized field order and/or additional custom data fields to be included in their market data feed. As was described above, electronic trading systems broadcast market data feeds to the market participants to notify them of changes in the state of the market, such as price updates, trade notifications, etc. The feeds comprise a stream of individual event messages which are multi-casted to the market participants in a predefined format, e.g. FIX/FAST, such that all market participants receive the same information. Upon receipt, many market participants, including feed aggregators which aggregate data feeds from other exchanges and which further may modify and/or relay the data feed to others, typically further process the market data from the feed, such as by using a Ticker Plant, to tailor the data, e.g. the content and/or format, to their particular needs, and then rebroadcast the modified data, such as to their individual trader/trader terminals.

This tailoring may further include extracting one or more subsets of data from each data feed message considered to be more important than the remaining data, reordering the data in a format further suitable for subsequent processing, e.g. so that more critical data is processed first, and deriving, extracting or otherwise computing values or metrics based on the data. It will be appreciated that such tailoring of the market data feed may occur elsewhere, such as at a trader terminal. Examples of derived values include "Greeks" which is a set of different measures/dimensions/variables of risk involved in taking a position in an option (or other derivative). Each Greek, or particular measure of risk, is a result of an imperfect assumption or relationship of the option with another underlying variable. Various sophisticated hedging strategies are used to neutralize or decrease the effects of one or more of these measures of risk. Not all of these risk measures are important to all market participants and some are more important than others. With the exception of vega (which is not a Greek letter), each measure of risk is represented by a different letter of the Greek alphabet. Greeks include,

- Δ(Delta) represents the rate of change between the option's price and the underlying asset's price—in other words, price sensitivity;
- Θ(Theta) represents the rate of change between an option portfolio and time, or time sensitivity;
- Γ(Gamma) represents the rate of change between an option portfolio's delta and the underlying asset's price—in other words, second-order time price sensitivity;
- γ(Vega) represents the rate of change between an option portfolio's value and the underlying asset's volatility—in other words, sensitivity to volatility; and
- ρ(Rho) represents the rate of change between an option portfolio's value and the interest rate, or sensitivity to the interest rate.

It will be appreciated that there may be other derived or computed values, now available or later developed, of interest to market participants which may be provided by the electronic trading system in a customized market data as described. For example, such other derived or computed values may include:

- non-public data—e.g. such as order identifiers or hidden quantities privy only to a specific trader;
- Position data—data showing a trader's risk exposure (similar to delta, but tied to actual orders) due to a shift in the market; or
- Requests For Quote(s)—certain requests for quotes may not be fully public, and need to be filtered only to the traders allowed to respond to the RFQ.

The disclosed embodiments recognize such processing, wherever it may take place outside of the electronic trading system, of the market data feed upon receipt imparts delay in ultimately providing that data, or the information derived therefrom, to the recipients who are waiting for it. Furthermore, Ticker Plants and trading software interfaces, which are typically comprised of custom software, are costly and not all market data recipients can afford to implement them or afford efficient implementations which minimize delay or provide all of the necessary functionality.

With current electronic trading system architectures, improving performance may result in reaching or exceeding the capacity of existing infrastructure components, which as was described above, may cause or reveal underlying faults or flaws, such as disparity along communications paths causing jitter or race conditions which results in non-deterministic operation. In particular, with respect to acknowledgement messages sent to specific traders indicative of order receipt confirmation, match events or other trader specific/privy notifications, and corresponding market data feed messages sent to all market participants reflecting corresponding market state or changes thereto, these disparities may result in the acknowledgement message being transmitted to the particular market participant prior to the corresponding market data message being transmitted to all of the market participants, or vice versa, which may result inequitable/unfair access to information. Such unfair information access may then be exploited to gain unfair financial or other advantages. Other solutions to ensuring equitable information access have included combining the acknowledgment and market data feeds into a single feed using participant-unique tokens or identifiers to signal when a particular feed message is also an acknowledgment to a particular trader, or encrypting the acknowledgement feed messages such that they can only be decrypted by a key provided within the corresponding market data feed message. The disclosed embodiments take a different approach, which may be used in conjunction with or independent of these other solutions, by gating corresponding acknowledgement messages and market data messages against each other at the point at which these messages egress the electronic trading system such that an acknowledgement message cannot be transmitted to a market participant until the corresponding market data message has been transmitted, or is ready to transmit, to all market participants.

In one implementation, gating logic is implemented at the point of message traffic egress from the electronic trading system, such as at the network switch or gateway, or other device through which both acknowledgement messages and market data messages flow en route to their recipients. As described above, the gating logic may be implemented in an FPGA coupled with the switch/gateway fabric/backplane. In operation, as will be described, the gating logic maintains a log or other data structure which stores data indicative of market data messages which have been transmitted prior to the corresponding acknowledgment message. Upon receipt of an acknowledgement message, the queue of market data messages is checked. If a corresponding market data message has already been transmitted, as indicated in the log, then the acknowledgment message is allowed to be forwarded on towards its destination. However if the corresponding market data message has not yet been transmitted, then the acknowledgement message is stored in a buffer or other memory. Similarly, upon receipt of a market data message, the buffer of stored acknowledgment messages is checked and if a corresponding acknowledgement message is found, both market data message and corresponding acknowledgment message are forwarded to their respective destinations. If a corresponding acknowledgment message has not yet been received, i.e. is not stored in the buffer then the market data message is forwarded toward its destination and data indicative thereof is stored in the log to await receipt of the corresponding acknowledgment message.

An order to trade, or trade order, is effectively an order or request for a transaction with respect to a financial instrument, such as futures contract, options on future, spread or other combination contract, etc., wherein the transaction further specifies at least whether the trader desires to buy (bid) or sell (offer) the financial instrument, the desired price therefore, and quantity thereof. It will be further appreciated that other factors, such as conditions, e.g. stop orders, etc., may also be specified. Further the price may be specified as a fixed value, relative value, upper or lower limit value, or range of values. The financial instrument may comprise one or more component instruments or component transactions. A financial instrument comprising more than one component instrument may also be referred to as a combination contract or combination financial instrument. A combination contract, also referred to as a strategy, may be defined as a combination of orders for outright contracts where each order for an outright contract forms a "leg" of the strategy, also referred to as a leg order. The definition of the combination contract further specifies whether buying a unit quantity of the strategy, i.e. the combination contract, requires a given leg to be bought or sold and in what quantity. Strategies may be defined by the exchange and advertised to traders as tradable instruments and/or they may be defined upon request by a market participant, such as via a request submitted to the Exchange. As described above, a combination contract permits the simultaneous trading of the component instruments thereof, i.e. simultaneous submission on the orders therefore, into a market for that instrument. Combination contracts may be used to hedge risk, e.g. risk that a price of the underlier will rise or fall in the future, risk that prices will be volatile, risk of a rise or fall in interest rates, or other risk. It will be appreciated that market participants may attempt to simulate combination contracts, particularly those not defined by the Exchange and therefore were no specific market for the combination contract exists, by separately submitting the component transactions as separate orders into the associated markets but may incur additional transaction fees and the risk, referred to as "leg risk," that the individual orders may be not be processed as desired, such as due to a change in the market at the time of submission or proximate thereto.

An order for a financial instrument comprising more than one component instrument, i.e. a combination financial instrument or contract, enables a trader to transact in multiple instruments with a single transaction which, for example, reduces transaction fees and/or the delay between submission of orders for the involved financial instruments (which may be advantageous when prices for those instruments are quickly changing), thereby reducing leg risk. A common example of a combination contract is a spread. A spread is the simultaneous buying of one financial instrument and selling of another financial instrument. For example, in a calendar spread, the trader buys (or sells) a futures contract for a particular underlier expiring in a particular month and sells (or buys) another futures contract for the same underlier expiring in another month, such as a later month. Using a calendar spread, the trader is seeking to take advantage of a rise or fall in price, as the case may be, between the expiration months of the two futures contracts. Each financial instrument of the combinations financial instrument may be referred to as a leg, leg contract or leg order. Combination financial instruments are themselves tradeable objects which are typically listed on their own order book separate from the order books for the individual component financial instruments, i.e. leg contracts, which can be separately traded as well. For example, a trader may buy or sell a spread contract which comprises a buy of A and sell of B. Further, a separate spread contract comprising a sell of A and buy of B may also be offered for trading. Other examples of combination financial instruments, which may have two or more component financial instruments, include inter-commodity spreads, intra-commodity spreads, futures strips, condor spreads, butterfly spreads, crack spreads, collar contracts, strangle contract, straddle contracts, etc. It will be appreciated that a given component financial instrument may itself be comprised of component financial instruments. For example, a financial instrument may comprise two separate spread contracts. It is possible to define combination contracts where the purchase of a single unit of the combination requires the purchase or sale of any number of units in the legs. The number of units required of any given leg is referred to as its volume ratio. Examples of strategies that include legs having different volume ratios include, but are not limited to, the butterfly, the double butterfly, crack spreads, crush spreads, and other ratio spreads.

Upon receipt of an incoming order to trade in a particular financial instrument, whether for a single component financial instrument, e.g. a single futures contract, or for multiple component financial instruments, e.g. a combination contract such as a spread contract, a match engine, as will be described in detail below, will attempt to identify a previously received but unsatisfied order counter thereto, i.e. for the opposite transaction (buy or sell) in the same financial instrument at the same or better price (but not necessarily for the same quantity unless, for example, either order specifies a condition that it must be entirely filled or not at all). Previously received but unsatisfied orders, i.e. orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments.

The order for a particular financial instrument actually received from a market participant, whether it comprises one or more component financial instruments, is referred to as a "real" or "outright" order, or simply as an outright. The one or more orders which must be synthesized into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate among them, such as by picking the implied match comprising the least number of component financial instruments or the least number of synthesized orders.

Upon receipt of an incoming order, or thereafter, the identification or derivation of a combination of one or more suitable counter orders which have not actually been received but if they were received, would allow at least a partial trade of the incoming order to be executed, is referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed to appear available to trade in order to solicit the desired orders from the market participants. Depending on the number component financial instruments involved, and whether those component financial instruments further comprise component financial instruments of their own, there may be numerous implied opportunities, the submission thereof, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Furthermore, identifying implied matches is also computationally intensive. Generally, for an incoming order, a match in the outright market/order book therefore is preferred over implied matches. However, once it is determined that a suitable outright order is not available or there is still residual quantity available in the incoming order, if an implied match is to be found, it must be done so quickly so as not to miss the trading opportunity, e.g. if the implied markets are highly liquid or otherwise volatile, or unduly delay posting the unsatisfied incoming order, or unsatisfied portion thereof, to the order book. While successful identification of a suitable implied match would benefit the trader by providing a heretofore unavailable opportunity to trade, the delay in performing the identification process may create or increase leg risk or otherwise, especially if unsuccessful, may unduly prejudice that trader. Identifying an implied match is a complex process because of, among other considerations, the large number of potential order combinations upon which implied orders may be based. For example, a single commodity product available in 72 different delivery months will have 72 possible outright contracts, each of which may have a resting buy order or a resting sell order. There are 2556 (=(72*71)/2) potential spread contracts, noting that the buy/sell combination and sell/buy combination of any two outright contracts both correspond to the same spread contract. For a simple implied where two real orders combine to form a third order, there are 5256 (=2*72+2*2556) choices of the order to imply and 71 (=72-1) ways to choose a combination of two orders implying any given third order, leading to 373,156 combinations overall. As the number and complexity of the contracts involved in implication gets larger, the number of possible combinations grows exponentially.

For these reasons, trading systems that derive implied orders are often limited by computing capacity and speed.

Conventional trading systems do not have an efficient method of determining all possible or best possible implied markets, especially when the order combinations involve more than a few orders. Accordingly, they limit the degree to which implication may be carried out, for example to only the component financial instruments of the financial instrument of the incoming order, or a limited subset of the combinations thereof. This has the practical effect of limiting the degree of liquidity, i.e. opportunities to trade, which the Exchange may offer, thereby limiting the potential revenue, via transaction fees, that the Exchange may earn.

In current electronic trading systems, the implication process occurs within the match engine so as to have access to the match event data as quickly as possible and determine whether an implied match exists, or whether an implied opportunity should be advertised, before the match event is communicated to the market participants. This in turn implies that this match engine must be privy to all of the markets, i.e. order books, which the implication process needs. Limited computational capacity/resources of the match engine results in a limited number of order books which can be managed and, therefore, limits the degree of implication.

In one embodiment, using the orderer/decider architecture described above, the implication process is moved outside the match engine, such as to be, for example, co-located with the Decider of one or more Order/Decider match engines, described above, such as on the same FPGA or within the same switch, gateway or other network device, so as to be privy to the match events generated thereby indicative of whether incoming orders are matched or not. In one implementation, an implicator is provided which listens to all match events and, using a set of self-maintained "shadow order books", attempts to identify, calculate or derive implied matches.

If an implied match is identified, the implicator generates one or more synthetic orders into the necessary markets and injects them into the stream of incoming orders to the relevant Orderers. These synthetic orders are then processed like any other orders resulting in the necessary implied matches. As the implicator may be privy to the match event data from multiple markets, and in one embodiment all markets, it can identify a wider array of implied intra- and inter-market matches thereby improving liquidity. These synthetic orders can be injected ahead of any real orders that may be inbound to complete the implied transaction ahead thereof. In one embodiment, injecting a synthetic order ahead of a real order may be accomplished by fabricating a time stamp/sequence to cause the synthetic order or transaction to be processed before others, even if the synthetic transaction is created or provided to the match engine later, or after the real order is received.

The ability to identify implied matches across a wider variety of markets further enables the electronic trading system to offer a wider variety of combination financial instruments, e.g. more complex combinations, even where the market therefore may be characterized by lower liquidity, such as due to the lower demand for such a complex product. In particular, the disclosed system may improve liquidity via the identification of implied matches in the relevant component financial instrument markets alleviating the need for liquidity in the specific market for the financial instrument.

Further, in one embodiment, the process by which implied matches are identified may be separated from the process by which implied opportunities are identified. In particular, once it has been determined that an incoming order has not been satisfied, or has only been partially satisfied, both my attempting to identify an outright order match and an implied match, the incoming order, with its residual quantity, will be placed on the order book to rest and to be advertised to the market participants as being available to trade. As was described above, to further improve liquidity by creating additional opportunities for this order to be traded, an implied opportunity processor may then determine what, if any, one or more orders in related markets, if received, would allow the incoming order to trade. To facilitate this process, the implied opportunity generator, as will be described, may maintain its own shadow set of order books. It will be appreciated that the implied opportunity processor, as will be described, may derive, calculate, or otherwise compute more than one implied opportunity, each of which may, alone or in concert with other resting outright orders, allow the incoming order to trade and wherein when any one of these one or more implied opportunities is traded against, the remaining implied opportunities are canceled. Further, should orders be placed against more than one of these implied opportunities, arbitration mechanisms may be provided to determine which will prevail. Alternatively, the implied opportunity processor may determine that more than one implied opportunity is needed, alone or in concert with presently resting orders. As implied opportunities are synthetic and only tradeable if all of the related orders are tradeable, mechanisms may be necessary, for example, to ensure that all of the implied opportunities are simultaneously traded together or not at all. Alternatively, the implied opportunity may be permitted to trade under the assumption that the remaining opportunities will also be traded eventually, thereby allowing all of the related orders to be traded, wherein the Exchange, or another entity, such as a Market Maker, adopts the synthetic counter position and the risk that all of the implied opportunities will not be traded.

The identified implied opportunities are then added to the market data so as to solicit the desired orders. That is, synthetic market data events are generated to advertise the availability of the implied opportunity in order to solicit the desired order(s). In one embodiment, synthetic orders identical to those needed are injected into the incoming order stream of the relevant markets. As the implied match function would have already determined that suitable counter orders do not exist in those markets, these synthetic orders will not be matched and instead will be rested on the respective order books and advertised to the market participants via the standard market data feed. Should a market participant choose to trade against one of these synthetic orders, the implied matching functionality described above may see such orders to create an implied match and execute trades among all of the relevant orders. Separating implied opportunity from implied match allows streamlining of both functions so that the processing can be performed quickly. In particular, identification of implied matches involves reviewing the order books of products which share at least one common component instrument to discern if the requisite orders are resting therein. In contrast, the identification of implied opportunities requires knowledge of the available order books for products sharing at least one common component instrument, but review of those order books may be unnecessary assuming an implied match was not previously identified. In one embodiment, while the functions of implied match identification and implied opportunity identification may be separated, they may still be coupled with each other so as, for example, allow the implied match processor to identify those orders that it was unable to identify during its process to the implied opportunity generator. Furthermore, identification of implied matching typically requires analysis of a greater number of generations of combination instruments as the component instruments typically further comprise component instruments of their own, as compared to identification of implied opportunities where such opportunities are typically readily identified via identification of common singular component instruments. Further, while identification of implied matches is done as part of/in concert with the matching process, a process which must be performed sequentially, quickly and deterministically, the identification of implied opportunities is effectively merely producing information to be broadcast to the market participants and can be performed in parallel with the matching process or otherwise separately therefrom. Separation further permits the electronic trading system to offer either identification of implied matches or implied opportunities but not both if necessary. For example, due to high volumes, it may be desirable to turn down the frequency of implied opportunity identification, however, turning off implied match identification may change the liquidity pool and alter the market, so it should remain on during the life of a trading session.

In order to compute implied matches and/or opportunities, access to all of the interdependent order books is necessary so as to be able to identify suitable markets and actual or hypothetical resting orders therein which permit a given transaction to be completed. However, limited data storage capacity and/or bandwidth therewith limits the number of order books which may be stored and/or accessed by any given match engine. Aside from restricting liquidity and the variety of product offerings, this also necessitates providing specific match engines to handle specific markets which necessarily constrains transaction throughput and fault tolerance.

Accordingly, in one embodiment of the disclosed electronic trading system architecture, multiple generic match engines, or redundant match engine sets, as described above, may be provided which are capable of processing a transaction for any of the markets provided by the electronic trading system. All of the order books may be maintained in a centrally accessible memory architecture. As incoming orders are received, they may be allocated or otherwise disseminated to one of the generic match engines (or match engine sets). To determine which match engine (or set) to send the transaction for processing, the system may determine the outright and all related order books to the given transaction. If the identified order books have not yet been allocated to a match engine (or set thereof), an available match engine (or set) is selected, the identified order books are allocated and the incoming transaction is routed thereto. If the identified order books are already allocated to one of the match engines (or sets), the incoming order is routed to that match engine (or set). During transaction processing, the match engine (or set) accesses and updates the order books as needed to perform the matching and implication functions as described. When the match engine (or set) has completed processing of all transactions, before another transaction is routed thereto, it relinquishes its allocation of the identified order books, and is then available for a new transaction for a new set of identified order books.

In one embodiment, the allocation of identified order books may further include allocation of a defined matching algorithm to be applied by the match engine (or set). This allows different matching algorithms to be used by each match engine.

Allocation of the identified order books may be implemented by actually transferring the data representative thereof to a memory associated with the selected match engine and then transferring the updated order books back to the central memory upon deallocation. Alternatively, access to the central memory and, further, to the identified order books, may be allocated such as by providing the memory address locations of identified order books in the central memory to the selected match engine (or set), such as via provision of a sparse matrix or other data structure which comprises the identification of the requisite memory locations. Updates to the order books in the central memory may then be accomplished via remote direct memory access ("RDMA") or other back channel network based memory access. It will be appreciated other storage resource sharing mechanisms may be utilized, such as non-uniform memory architecture (NUMA) compliant mechanisms, structured or unstructured databases, such as tag clouds, etc.

The disclosed embodiment, thereby, provide for fungible generic match engines which can handle independent/unrelated markets in parallel. In one embodiment, the number of generic match engines (or sets thereof) may be set so as to statistically minimize transaction latency among transactions to independent/unrelated markets. Order books are only tied to a given match engine (or set) for the duration of the order processing of transactions therein. By altering the degree of interdependencies computed to identify related order books, parallelism among transaction processing and/or liquidity/trading opportunities can be balanced.

While the disclosed embodiments may be discussed in relation to futures and/or options on futures trading using a central limit order book ("CLOB"), it will be appreciated that the disclosed embodiments may be applicable to any financial instrument, e.g. equity, options or futures, trading system or market now available or later developed, which may use a CLOB, a Request for Quote or other methodology. A CLOB is a trading method used by most exchanges globally. It is a transparent system that matches customer orders (e.g. bids and offers) on a 'price time priority' basis. The highest ("best") bid order and the lowest ("cheapest") offer order constitutes the best market or "the touch" in a given security or swap contract. Customers can routinely cross the bid/ask spread to effect low cost execution. They also can see market depth or the "stack" in which customers can view bid orders for various sizes and prices on one side vs. viewing offer orders at various sizes and prices on the other side. The CLOB is by definition fully transparent, real-time, anonymous and low cost in execution. In the CLOB model, customers can trade directly with dealers, dealers can trade with other dealers, and importantly, customers can trade directly with other customers anonymously. In contrast to the CLOB approach, the RFQ trading method is an asymmetric trade execution model. In this method, a customer queries a finite set of participant market makers who quote a bid/offer ("a market") to the customer. The customer may only "hit the bid" (sell to the highest bidder) or "lift the offer" (buy from the cheapest seller). The customer is prohibited from stepping inside the bid/ask spread and thereby reducing its execution fees. Contrary to the CLOB model, customers can only trade with dealers. They cannot trade with other customers, and importantly, they cannot make markets themselves.

A limit order is an order to buy a security at no more than a specific price, or to sell a security at no less than a specific price (called "or better" for either direction). This gives the trader (customer) control over the price at which the trade is executed; however, the order may never be executed ("filled"). Limit orders are used when the trader wishes to control price rather than certainty of execution. A market order is a buy or sell order to be executed immediately at current market prices. As long as there are willing sellers and buyers, market orders are filled. Market orders are therefore used when certainty of execution is a priority over price of execution. A conditional order is any order other than a limit order which is executed only when a specific condition is satisfied, such as a stop or stop-loss order which is an order to buy or sell a stock once the price of the stock reaches a specified price.

As was described above, an order to trade, whether it be a limit order, market order, conditional order or some other order type, may be considered a business transaction, i.e. one or more operations or acts which implement one or more business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the business rules, may be deterministic in that they must occur, or be processed, in an (temporal) order and/or in real time as defined by business rules and/or to effect the business/commercial purpose or meet participant expectations. It will be appreciated that such deterministic processing may, in fact, result in out of order processing depending on the business rules, such as where conditions for processing orders are imposed which may not be met by an earlier transaction before a later transaction. Deterministic order may be paramount. Real time processing may be secondary. For example, when an offer transaction is received to which an prior offer transaction counter thereto has not been previously received, it should be matched with the next offer transaction received counter thereto (in a FIFO market). However, if the earlier offer transaction specifies a condition, such as that it must be completely filled or not at all, it may be deferred in favor of a later arriving offer transaction when the condition is not met. As was discussed above, the representation (but not, perhaps, the perception) of the current state of the business environment, e.g. market, in which the business transactions are transacted, or changes therein, should present an accurate reflection of the actual state or state change so as to not mislead participants or provide an unfair advantage.

An exemplary trading network environment including the disclosed electronic trading system 100 is shown in FIG. 1. In the exemplary environment, the electronic trading system 100 receives orders and transmits market data, e.g. related to orders and trades, to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The electronic trading system 100 may be physically implemented with one or more mainframe, desktop or other computers, such as the computer 1100 described below with respect to FIG. 11, reconfigurable logic components, network switches, gateways, routers and other communications devices operative to facilitate communications within the electronic trading system 100 and between the electronic trading system 100 and the market participants. Logically, the electronic trading system 100 implements numerous functions/functional modules each of which, as will be described, may be implemented in software, hardware or a combination thereof, as single standalone component or combination of interconnected components or in combination with another function/functional module.

It will be appreciated that identifying and defining the boundaries of an inter-networked communications system, the internal components thereof being interconnected as well, such as between the electronic trading system 100 and market participants and the infrastructure which allows communications there between, may be complex. Physically, the various network device, e.g. switches, gateways, routers, and the cabling and connections there between, may be owned, leased and/or controlled by different entities, as well as physically located in disparate geographic locations which may be geographically proximate to, or remote from, the entity which owns, leases or controls the network device. In some cases, a network device owned and operated by a service provider may be physically located within the premises of entity to which the services are provide or, alternatively, the network device owned and operated by the service recipient may be physically located within the premises of the service provider, both situations being referred to as colocation. Logically, the paths, and the boundaries there between, over which transactions flow and the boundaries between entities may be more difficult to discern.

Accordingly, as generally used herein, the electronic trading system 100, or the components or boundaries thereof, may be defined in numerous ways. In particular, the physical electronic trading system 100 may be defined by the entity defines the business rules for processing trading transactions and which owns or otherwise controls the components which implement those rules, wherever those components may be geographically located. The logical boundaries of the electronic trading system 100, which may also be referred to as the demarcation point or edge 142, may be defined as the first, or last, point at which the electronic trading system 100 can control or otherwise manipulate an incoming, or outgoing, transmission, e.g. data message or packet. For example, for an outgoing data packet, the edge 142 of the electronic trading system 100 may be defined as the last point at which the electronic trading system 100, or component thereof, can recall or otherwise stop the transmission. For example, the demarcation point or edge 142 may be the point at which a market data message is provided to the multi-casting protocol for transmission or other point where data packets are individually forwarded toward their respective destinations, e.g. individually distinguishable by destination address. In at least one disclosed embodiment, the edge or demarcation point 142 may further be defined as the point at which data messages or packets destined for multiple market participants are transmitted simultaneously, or substantially simultaneously, i.e. transmitted with short a time period such that an observer would consider them simultaneously transmitted or otherwise find the difference there between practically, logically or physically imperceptible. Thereafter, variation in network path latencies, etc. may impart unequal delays on the delivery of those messages.

Generally, the edge 142 will lie between a component of the electronic trading system 100, such as a router or gateway device (not shown), and a component, such as router or gateway device (not shown), controlled by another entity, such as an Internet Service Provider or other operator of the LAN 124 or WAN 126 shown in FIG. 1. As described above, the edge or demarcation point 142 may be geographically located anywhere, e.g. it may be geographically proximate to or remote from the other components of the electronic trading system 100. In some embodiments, market participants may collocate devices for receiving data from the electronic trading system 100 in the same geographic location as the components of the electronic trading system 100 which transmit that data.

Referring back to FIG. 1, functions/functional modules of the electronic trading system 100 may include a user database 102, stored in a memory other storage component, e.g. see the description below with respect to FIG. 11, which includes information identifying market participants, e.g. traders, brokers, etc., and other users of electronic trading system 100, such as account numbers or identifiers, user names and passwords. An account data function 104 may be provided which may process account information that may be used during the matching and trading process, such as processing trading fees or maintaining credit limits, etc. A match engine function 106, described in detail below, may be included to receive incoming transactions and access order books, such as may be stored in the order book function 110, and match incoming and resting transactions, such as bid and offer prices, and may be implemented with software that executes one or more algorithms for matching bids and offers, e.g. FIFO, pro rata, etc. A trade database 108, stored in a memory or other storage medium, may be included to store information identifying trades and descriptions of trades. In particular, a trade database may store information identifying the time that a trade took place and the contract price. An order book function 110 may be included to store resting offers to buy or sell for the various products traded on the exchanges and to compute or otherwise determine current bid and offer prices for those products. A market data function 112 may be included to collect market data and prepare the data for transmission to market participants. A risk management function 134 may be included to compute and determine a user's risk utilization in relation to the user's defined risk thresholds, i.e. implement credit controls as will be described. An order processing function 136 may be included to decompose delta based and bulk order types for processing by the order book function 110 and/or match engine function 106. A volume control function 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the electronic trading system 100 components, including the user database 102, the account data function 104, the match engine function 106, the trade database 108, the order book function 110, the market data function 112, the risk management function 134, the order processing function 136, or other component or function of the electronic trading system 100.

The trading network environment shown in FIG. 1 includes exemplary computer devices 114, 116, 118, 120 and 122 which depict different exemplary methods or media by which a computer device may be coupled with, either directly or indirectly, the electronic trading system 100 or by which a user may communicate, e.g. send and receive, trade or other information therewith. It will be appreciated that the types of computer devices deployed by market participants and the methods and media by which they communicate with the electronic trading system 100 is implementation dependent and may vary and that not all of the depicted computer devices and/or means/media of communication may be used and that other computer devices and/or means/media of communications, now available or later developed may be used. Each computer device, which may comprise a computer 1100 described in more detail below with respect to FIG. 11, may include a central processor that controls the overall operation of the computer and a system bus that connects the central processor to one or more conventional components, such as a network card or modem. Each computer device may also include a variety of interface units and drives for reading and writing data or files and communicating with other computer devices and with the electronic trading system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 1120 shown in FIG. 11 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the electronic trading system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computers and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126, such as via a network gateway or router (not shown), which may be comprised of one or more public or private wired or wireless networks. In one embodiment, the WAN 126 includes the Internet 126. The LAN 124 may include a router to connect LAN 124 to the Internet 126.

Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 1120 shown in FIG. 11 and described below with respect thereto.

As was described above, the users, i.e. the market participants, of the electronic trading system 100 may include one or more market makers 130 which may maintain a market by providing constant bid and offer prices for a derivative or security to the electronic trading system 100, such as via one of the exemplary computer devices depicted. The electronic trading system 100 may also exchange information with other trade engines, such as trade engine 138. One skilled in the art will appreciate that numerous additional computers and systems may be coupled to electronic trading system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to the electronic trading system 100. In another example, the exemplary computer device 118 may include computer-executable instructions for receiving market data from the electronic trading system 100 and displaying that information to a user.

Of course, numerous additional servers, computers, handheld devices, personal digital assistants, telephones and other devices may also be connected to the electronic trading system 100. Moreover, one skilled in the art will appreciate that the topology shown in FIG. 1 is merely an example and that the components shown in FIG. 1 may include other components not shown and be connected by numerous alternative topologies.

Deterministic Architecture

Figure 2:
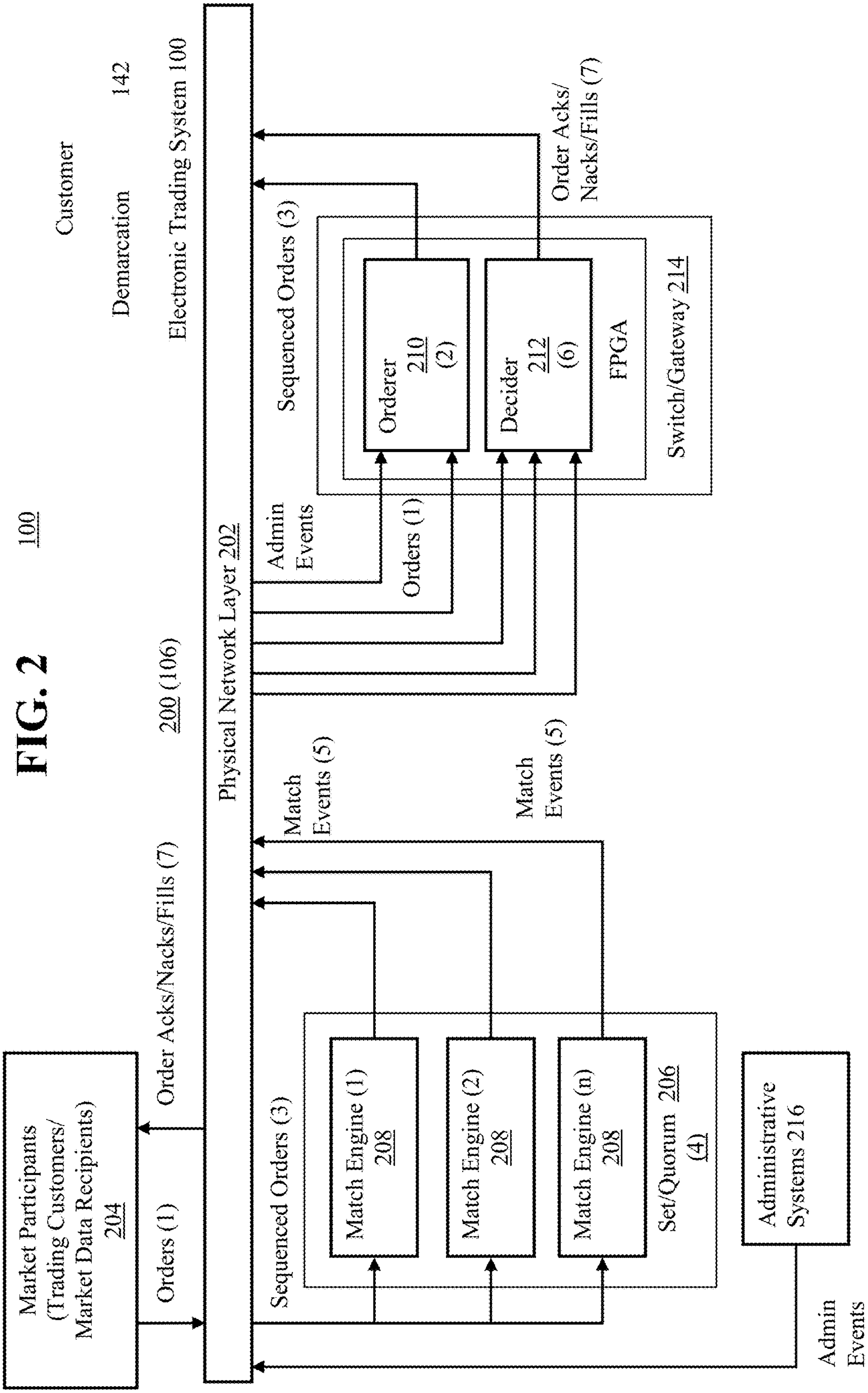
FIG. 2 depicts a block diagram of an exemplary implementation of the system of FIG. 1 according to one embodiment.

FIG. 2 shows a block diagram depicting, in more detail, the match engine 106 and order processing 136 function of the electronic trading system 100, according to one embodiment. It will be understood that numbers shown in parentheses next to arrows in this figure and in the other figures are indicative of one exemplary order of data flow through the depicted system and show how data/transactions enter the electronic trading system's 100 physical network layer 202 and are routed, processed and/or transformed by the components shown in the figure and described herein. As shown in FIG. 2, the electronic trading system 100 includes an interconnecting infrastructure, such as a physical communication network 202, which may include network devices such as gateways, switches, and interconnecting media there between, such as backplane interconnects, optical and electrical communications media or other wired or wireless interconnect. The interconnecting infrastructure generally couples the various components of the electronic trading system 100 together and with market participant devices 204 as was described.

The electronic trading system 100, as described above, includes a match engine function 106 which may be implemented by one or more sets 206 of transaction processors 208, i.e. match engines. While a single set 206 of match engines 208 will be described herein, it will be appreciated that many such sets 206 may be implemented both to improve fault tolerance through redundant operation and to increase the transaction handling capacity of the electronic trading system 100.

As used herein, a "match engine" 106 refers to either a conventional match engine or a redundant set of match engines as described. Each of the plurality of match engines, i.e. conventional or redundant sets, implement at least one market, or order book representative thereof, for an associated financial instrument, e.g. futures, options contracts, a single contract therefore or a strategy/combination of contracts, such as a spread, wherein each associated financial instrument comprises at least one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied. In one embodiment, the systems 210 and 212 may be implemented as reconfigurable logic devices, e.g. FPGAs, and coupled with the match engines.

Coupled with the set 206 of redundant match engines 208 via the interconnecting infrastructure is the order processing 136 of the electronic trading system. In one embodiment, the order processing function 136 is implemented on one or more FPGA devices, i.e. by one or more logic components thereof, coupled with the network gateway device (not shown), such as via a backplane interconnect, through which incoming transactions ingress the electronic trading system 100 and outgoing messages egress the electronic trading system 100. The network gateway device is further coupled with the interconnecting infrastructure to which the set 206 of match engines 208 are also coupled. It will be appreciated that the set 206 of transaction processors may be coupled with the order processing function 136 via other means such as a dedicated interconnection there between. Further, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

As was described above, the order processing function 136 receives incoming transactions from the market participants 204 and ensures deterministic processing thereof, i.e. that the incoming transactions are processed according to the defined business rules of the electronic trading system 100, e.g. in the order in which they are received by the order processing function 136. Further, the order processing function 136 receives the output of each of the redundant match engines 208 of the set 206 and evaluates those results to determine the correct result. The order processing function 136 may then further generate, or cause to be generated, appropriate acknowledgements and/or market data based thereon which are then communicated to the market participants 204.

In particular, FIG. 2 depicts a block diagram of a system 200, which may also be referred to as an architecture, for processing a plurality, e.g. a series or sequence, of financial transactions, such as orders to trade a financial product, received via a network, such as the network 126 of FIG. 1, from a plurality of market participants 204, the processing of each transaction operative to cause a change in a current state of an electronic marketplace for one or more financial products. In one embodiment, each transaction may comprise a request to transact, e.g. an order to buy or sell, one or more financial products. A request to transact may further comprise a request to cancel a previous transaction, a status inquiry or other transaction.

The system 200 includes a transaction receiver 210, e.g. an orderer as described above, which may be implemented as one or more logic components such as on an FPGA which may include a memory or reconfigurable component to store logic and processing component to execute the stored logic, coupled with the network 126, such as via the interconnection infrastructure 202, and operative to receive each of the plurality of financial transactions and, upon receipt, augment, or otherwise ascribe or associate with, the received financial transaction with time signal data, which may be based on a system clock of system 100, or a system clock associated with transaction receiver 210, or any type of sequential counter.

The transaction receiver 210 may also be operative to augment, or otherwise ascribe or associate with, the received financial transaction with sequence data, such as an ordering or sequence number, indicative of a relationship, temporal or otherwise based on business rules/logic, e.g. a deterministic relationship, between the received financial transaction, e.g. the time of receipt thereof, and any of the plurality of financial transactions, e.g. the times of receipt thereof, previously and/or subsequently received by the transaction receiver 210. The ascribed ordering may then implicitly define the relationship with those transactions received thereafter. In one embodiment, the ordering may be a time stamp or, alternatively, an incremented sequence number.

It should be appreciated that if the transaction receiver 210 augments the received financial transactions with time signal data and timestamp data, which may be the same data, the data may be used in different ways, as described herein. In particular, the time signal data may be used to achieve synchronization of scheduled events. For example, a timestamp may be used by the transaction receiver to determine an order in which the financial transactions are processed by the match engines downstream.

The system 200 also includes a plurality 206 of transaction processors 208, e.g. match engines, coupled with the transaction receiver 210, such as via the communications infrastructure 202, each of the plurality 206 of transaction processors 208 operative to compare the time signal data in each received augmented financial transaction with scheduled instructions stored in a memory coupled with each transaction processor.

The transaction processors 208 may also be operative to, upon determining that the time signal data in a received augmented financial transaction corresponds to one or more of the scheduled instructions, execute the one or more of the scheduled instructions.

In one embodiment, the scheduled instructions received by the plurality 206 of transaction processors 208 may be different. Alternatively, the scheduled instructions received by the plurality 206 of transaction processors 208 may be the same.

In one embodiment, the transaction receiver 210 may generate a timestamp message if the transaction receiver 210 has not received a financial transaction message in a predetermined amount of time, e.g., a market for a product is not very active. The timestamp message includes time signal data, and the timestamp message may then be received by each of the transaction processors. The transaction receiver 210 may thus inform each of the transaction processors as to the current time if the transaction receiver 210 has not received a financial transaction message in a predetermined amount of time. The transaction processors then can use the time signal data in the timestamp message to perform scheduled tasks.

The transaction processors 208 may also be operative to receive each of the augmented financial transactions and process, e.g. apply the business logic/matching algorithm to, the received augmented financial transaction in accordance with the sequence data to determine the change in the current state of the electronic marketplace caused thereby. As was described above, the processing is irrespective of the sequence in which each of the augmented financial transactions are received from the orderer, which may be different from the relationship indicated by the sequence data and which may result in a different change in the state of the electronic marketplace.

In one embodiment of the system 200, the processing of received augmented financial transactions implements a central limit order book of a financial market for at least one financial instrument.

In one embodiment of the system 200, each of the plurality 206 transaction processors 208 operates asynchronously with respect to the others of the plurality 206 of transaction processors 208, but, if operating properly, process the augmented financial transactions the, same, i.e. according to the sequence data and the applicable business rules. It will be appreciated that transaction processors 208 of redundant set 206 may be added or removed at will.

In one embodiment of the system 200 the relationship indicated by the sequence data of a particular augmented financial transaction with respect to others of the augmented financial transactions is different from a relationship indicated by the order of receipt by one or more of the plurality of transaction processors of the particular augmented financial transaction with respect to the others of the augmented financial transactions, such as due to underlying processing priorities, transmission and/or routing anomalies, and would result in a different state change in the electronic marketplace.

In one embodiment of the system 200, each of the financial transactions comprises a request to transact in one of the one or more financial products, the processing of each augmented financial transactions comprising identifying whether a previously processed augmented financial transaction remains incomplete and is counter thereto and, if so, indicating that a transaction there between may be completed, and if not, indicating that data indicative of the availability of the augmented financial transaction be stored in a database.

The system 200 further includes a result arbiter 212, e.g. a decider as described above, which may be implemented as one or more logic components such as on the same or a different FPGA as the orderer 210, coupled with each of the plurality 206 of transaction processors 208, such as via the communications infrastructure 202, and operative to receive therefrom at least one of the determined changes in the state of the electronic marketplace for each processed augmented financial transaction and, based thereon, determine a selected change in the current state of the electronic marketplace for the processed augmented financial transaction and apply the selected change in the current state of the electronic marketplace to update the state of the electronic marketplace, the current state of the electronic marketplace now reflective thereof.

In one embodiment of the system 200, the transaction receiver 210 and result arbiter 212 are implemented in a network switch coupled with the data link layer/network layer of the communications infrastructure.

In one embodiment of the system 200, the result arbiter 212 is operative to compare the received determined changes in the state of the electronic marketplace for each processed augmented financial transaction, and determine the selected change in the current state of the electronic market place to be the received determined change in the state of the electronic marketplace for each processed augmented financial transaction provided by, for example, the majority or a quorum of the plurality of transaction processors.

In one embodiment, the system 200, the result arbiter 212 may further determine that a transaction processor 208 of the plurality 206 of transaction processors 208 is faulty when the determined change in the state of the electronic marketplace for a processed augmented financial transaction received therefrom fails to agree with the determined changes in the state of the electronic marketplace for a processed augmented financial transaction received from at least one other of the plurality 206 of transaction processors 208. The determination may be subject to a time delay threshold defining an amount of time which must elapse without having received a result before a fault is declared. As will be described, this threshold may be defined so as to prevent determination of a fault when a delayed result is expected, such as when a particular transaction processor 208 is known to be performing maintenance operations or is otherwise busy, offline or deactivated.

For example, in one embodiment of the system 200, each of the plurality 206 of transaction processors 208 is operative to periodically perform one or more other functions, such as maintenance, e.g. garbage collection, during which augmented financial transactions are not processed or processing is delayed. In this embodiment, each of the plurality 206 of transaction processor 208 may be further configured to not perform the one or more other functions contemporaneously with the performance of the one or more other functions by the remaining of the plurality 206 of transaction processors 208. Alternatively, more than one transaction processor 208 may be allowed to perform other operations assuming a sufficient number are remaining to meet a requisite level of fault tolerance.

In one embodiment of the system 200, the plurality of financial transactions may further include a plurality of administrative transactions, each of which may or may not cause a change in the current state of the electronic marketplace. Such administrative transactions may include instructions to configure the transaction processors 208, such as to synchronize their operation or cause them to perform maintenance or other operations, such as garbage collection.

A component such as Administrative systems 216, which may be coupled with any of the other components of the system 100, such as via the network infrastructure, may generate instructions that each match engine should execute. The instructions may be administrative in nature, such that the instructions may not cause a change in the current state of the electronic marketplace. For example, the administrative instructions may include instructions to configure the transaction processors 208, such as to synchronize their operation or cause them to perform maintenance or other operations. As used herein, synchronize may be a broad term that may include, for example:

- Components performing or executing tasks in the same order, even if performed at different actual times (actual time meaning the time as observed and as agreed upon by time setting and measuring standards outside of the system in question, e.g., "wall clock time", e.g., measured independently of any clock of the system in question or under discussion, e.g., absolute time), such that the end results or end state of all components is identical;
- Components performing tasks upon receiving a same message, e.g., components performing a scheduled task upon receiving a message indicating that a time associated with the scheduled task has occurred; or
- Components performing all of the same tasks in the same order at the same actual time, substantially the same actual time, or at different actual times;
- Components performing some of the same tasks in the same relative order at the same actual time, substantially the same actual time, or at different actual times.

In one embodiment, synchronized may mean according to any desired timing sequence, whether regular, irregular, and/or wholly or partially simultaneous.

It may be useful to synchronize the execution of processing in multiple networked computing resources such that the processing is in a substantially concurrent manner.

For example, if component 2 performs tasks A, B, C in the same order as component 1 but 10 actual minutes after component 1 performs these tasks, components 1 and 2 may be considered to be synchronized. In one embodiment, synchronized may mean that the tasks are coordinated. In one embodiment, the tasks may be coordinated around receipt of a timing message or other occurrence of an event.

It should also be appreciated that the multiple components and systems discussed herein may be synchronized or coordinated to process all of the same transactions/instructions (e.g., be redundant). The systems and components discussed herein may be configured to be immediately consistent (e.g., process all of the same transactions/instructions at the same or substantially same actual or real time) or to be eventually consistent (e.g., process all of the same transactions/instructions at different actual or real time).

In one embodiment, eventually consistent systems may be optimized so that one component is optimized to perform one type of transaction and prioritizes performing that transaction type, another component is optimized to perform another type of transaction and prioritizes performing that transaction type, and the decider/arbiter described herein selects, as described herein, the results of performing a given transaction from the component optimized/prioritized to perform that type of transaction. For example, the decider/arbiter may forward or send the selected result to another component.

Moreover, the multiple components and systems discussed herein may be synchronized or coordinated to process some of the same transactions/instructions in a coordinated manner (e.g., the common transactions/instructions may all start or stop relative to a common event, e.g., the receipt of a timing message). The multiple components and systems discussed herein may be synchronized or coordinated to process the same or different transactions but against commonly shared data.

Thus, the match engines may receive messages from multiple sources. For example, the match engines may receive financial transactions to perform an action on a financial product that changes the state of an electronic marketplace for that financial product, e.g., customer orders, from one source, e.g., market participant computers. The match engines may also receive instructions to perform administrative operations, e.g., administrative instructions, from another source.

It may be desirable to control when match engines perform such administrative instructions, or in which sequence to perform the messages from the multiple sources. For example, it may be desirable to cause all of the match engines to perform an administrative instruction, such as closing the market, garbage collection, or software updates, in synchronization and/or coordination. Some instructions may be large (e.g., in terms of byte size, quantity of packets), such as messages to open or close a market) and therefore may take a long time to transmit to, or be processed via, a single transaction receiver. In a computerized financial exchange environment, passing large messages through a single point of entry or determinism can lead to undesirable latency, because all events would be limited to the throughput rate of the single point, e.g., the transaction receiver 210. Yet, as discussed herein, the transaction receiver 210, with its sequencing and ordering functionalities for messages/instructions/transactions received from different sources, may be necessary to ensure determinism.

The system 200 accordingly may be configured to generate operations or instructions to be processed by the match engines as well as instruction identifiers corresponding to each generated instruction. Instruction identifiers may be identifiers that uniquely correspond to system instructions, or to administrative transactions. For example, the Administrative systems component 216 may generate instructions that should be processed by one or more of the match engines as well as instruction identifiers corresponding to each generated instruction.

The plurality 206 of transaction processors 208, e.g. match engines, may be coupled with the Administrative systems component 216, such as via the communications infrastructure 202, each of the plurality 206 of transaction processors 208 operative to receive the instructions and instruction identifiers from the Administrative systems component 216. Each transaction processor 208 may store, but not execute, the received instruction in a cache or memory that is readily accessible. In other words, the match engines may receive the instructions but not process them upon receipt. Instead, the match engines may store them such that they are instantly, or at least substantially, instantly accessible. Instead of accessing the instructions when they are to be executed, the match engines receive and store them so that when the instructions are to be executed, there is substantially no latency or delay due to accessing the instructions, e.g. no transmission delay as they are already at the match engine.

Or, in one embodiment, the delay for accessing the instructions may be minimized by sending the instructions before they are to be executed. For example, sending instructions to a match engine 208 from the Administrative systems component 216 may require a first amount of time, or a first delay, e.g. due to memory read latency, etc. The instructions may be stored by the match engine, as described above, before being executed. When an instruction identifier is received identifying the instruction to be executed, the match engine may retrieve the stored instruction. Retrieving the instruction may require a second amount of time, or a second delay, e.g. due to memory read latency, etc. Notably, the first time or delay may be much greater than the second time or delay.

The transaction receiver 210 may also be operative to receive instruction identifiers from other components of the system 200, such as the Administrative systems component 216. The transaction receiver 210 may also be operative to augment, or otherwise ascribe or associate with, received instruction identifiers with sequence data, such as an ordering or sequence number, indicative of a relationship, temporal or otherwise based on business rules/logic, e.g. a deterministic relationship, between the received instruction identifier, e.g. the time of receipt thereof, and any of the plurality of instruction identifiers, e.g. the times of receipt thereof, previously and/or subsequently received by the transaction receiver 210. The ascribed ordering may then implicitly define the relationship with those instruction identifiers received thereafter. In one embodiment, the ordering may be a time stamp or, alternatively, an incremented sequence number.

It should be appreciated that if the transaction receiver 210 augments the received instruction identifiers with time signal data and timestamp data, which may be the same data, the data may be used in different ways, as described herein. In particular, the time signal data may be used to achieve synchronization of scheduled events. For example, a timestamp may be used by the transaction receiver to determine an order in which the instruction identifiers are processed by the match engines downstream.

The plurality 206 of transaction processors 208, e.g. match engines, may be coupled with the transaction receiver 210, such as via the communications infrastructure 202. For example, the transaction receiver 210 may receive instruction identifiers from the Administrative systems component 216 and augment them with sequence data as described herein. The transaction processors 208 may be operative to receive each of the augmented instruction identifiers and retrieve, from the local or readily accessible cache or memory, the instructions corresponding to each received augmented instruction identifier in accordance with the sequence data to perform the proper administrative operation.

As discussed herein, because the instructions are readily accessible, e.g., stored in a memory local to each transaction processor, the transaction processor can execute or process the correct instruction substantially immediately, e.g. without having to wait to receive the instruction, upon looking up the instruction based on the received augmented instruction identifier. For example, the system may implement a Content Addressable Memory (CAM).

The disclosed embodiments minimize the overall latency of a transaction processing system by at least a difference between the first delay and the second delay. It should be appreciated that in the disclosed embodiments, the Administrative systems component 216 still sends the instructions to the match engines, which requires the first amount of time. However, this first time occurs before the instructions are desired to be executed (as indicated by the Administrative systems component 216 sending the instruction identifier as a trigger to the transaction receiver 210). Thus, the first time may not represent a constraint or dependency or otherwise typically contribute to overall transaction processing system latency. When the Administrative systems component 216 sends the instruction identifier to the transaction receiver 210, the transaction receiver 210 augments, e.g., sequences and orders, all of the messages/transactions/instructions for the transaction processors 208 and sends same to the transaction processors 208. Upon receipt of an augmented instruction identifier, a transaction processor 208 retrieves the instruction associated with the received augmented instruction identifier, which as described above, only requires a second amount of time, or causes a second delay, which is much less than the first amount of time or the first delay.

As was described above, the processing performed by the transaction processors 208 is irrespective of the sequence in which each of the augmented instruction identifiers are received from the orderer, which may be different from the relationship indicated by the sequence data and which may result in a different change in the operation of transaction processors.

In one embodiment of the system 200, the processing of received augmented instruction identifiers controls or modifies the operation of the transaction processors but does not relate to or change the state of the electronic marketplace for a financial instrument.

In one embodiment of the system 200, each of the plurality 206 transaction processors 208 operates asynchronously with respect to the others of the plurality 206 of transaction processors 208, but, if operating properly, process the augmented instruction identifiers the, same, i.e. according to the sequence data and the applicable business rules. It will be appreciated that transaction processors 208 of redundant set 206 may be added or removed at will.

In one embodiment of the system 200 the relationship indicated by the sequence data of a particular augmented instruction identifier with respect to others of the augmented instruction identifiers is different from a relationship indicated by the order of receipt by one or more of the plurality of transaction processors of the particular augmented instruction identifier with respect to the others of the augmented instruction identifiers, such as due to underlying processing priorities, transmission and/or routing anomalies, and would result in a different operation of a transaction processor.

The system 200 further includes a result arbiter 212, e.g. a decider as described above, which may be implemented as one or more logic components such as on the same or a different FPGA as the orderer 210, coupled with each of the plurality 206 of transaction processors 208, such as via the communications infrastructure 202, and operative to receive therefrom at least one of the determined changes in the operation of the transaction processor for each processed augmented instruction identifier and, based thereon, determine a selected change in the current operation of the transaction processor for the processed augmented instruction identifier and apply the selected change in the current operation of the transaction processor.

In one embodiment of the system 200, the transaction receiver 210 and result arbiter 212 are implemented in a network switch coupled with the data link layer/network layer of the communications infrastructure.

In one embodiment of the system 200, the result arbiter 212 is operative to compare the received determined changes in the operation of the transaction processor for each processed augmented instruction identifier, and determine the selected change in the current operation of the transaction processor to be the received determined change in the operation of the transaction processor for each processed augmented instruction identifier provided by, for example, the majority or a quorum of the plurality of transaction processors.

In one embodiment, the system 200, the result arbiter 212 may further determine that a transaction processor 208 of the plurality 206 of transaction processors 208 is faulty when the determined change in the operation of the transaction processor for each processed augmented instruction identifier received therefrom fails to agree with the determined changes in the operation of the transaction processor for each processed augmented instruction identifier received from at least one other of the plurality 206 of transaction processors 208. The determination may be subject to a time delay threshold defining an amount of time which must elapse without having received a result before a fault is declared. As will be described, this threshold may be defined so as to prevent determination of a fault when a delayed result is expected, such as when a particular transaction processor 208 is known to be performing maintenance operations or is otherwise busy, offline or deactivated.

For example, in one embodiment of the system 200, each of the plurality 206 of transaction processors 208 is operative to periodically perform one or more other functions, such as maintenance, e.g. garbage collection, during which augmented instruction identifiers are not processed or processing is delayed. In this embodiment, each of the plurality 206 of transaction processor 208 may be further configured to not perform the one or more other functions contemporaneously with the performance of the one or more other functions by the remaining of the plurality 206 of transaction processors 208. Alternatively, more than one transaction processor 208 may be allowed to perform other operations assuming a sufficient number are remaining to meet a requisite level of fault tolerance.

Implementing the disclosed event based system, where an event may be a time, may allow for better environment replay and disaster recovery, including time compressed recovery.

Figure 3:
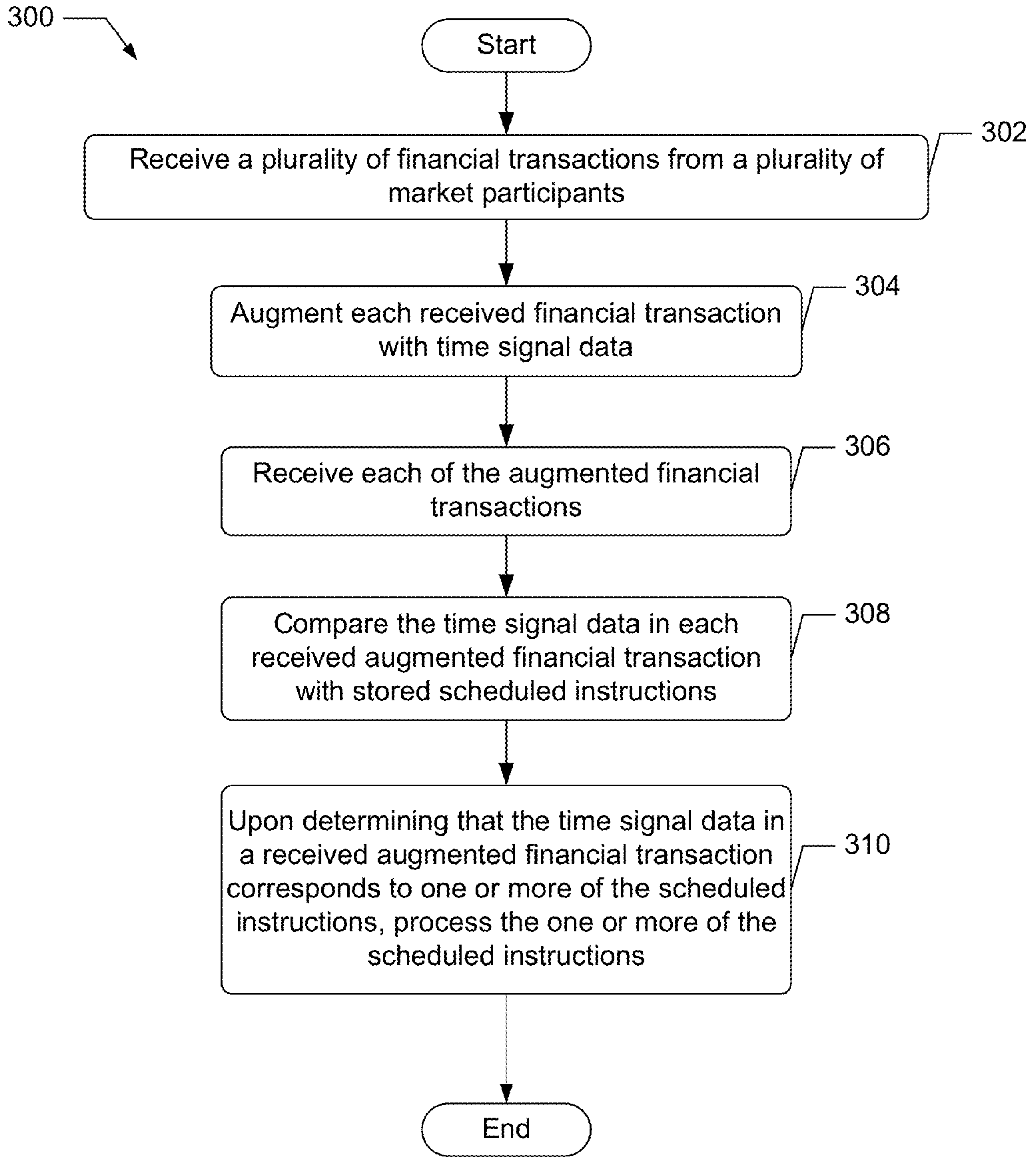
FIG. 3 depicts a flow chart showing operation of the system of FIG. 1 according to one embodiment.

FIG. 3 depicts a flow chart 300 showing operation of the system 200 of FIG. 2. In particular FIG. 3 shows a computer and/or FPGA implemented method for processing a plurality, e.g. a series or sequence, of financial transactions, such as orders to trade a financial product, received via a network, such as the network 126 of FIG. 1, from a plurality of market participants 204, the processing of each transaction operative to cause a change in a current state of an electronic marketplace for one or more financial products. In one embodiment, each transaction may comprise a request to transact, e.g. an order to buy or sell, one or more financial products. A request to transact may further comprise a request to cancel a previous transaction, a status inquiry or other transaction.

The operation of the system 200 includes receiving, by a transaction receiver 210 from the network 126, such as via the interconnection infrastructure 202, each of the plurality of financial transactions (Block 302). The operation of the system 200 further includes augmenting, by the transaction receiver 210, the received financial transaction with time signal data, such as a timestamp based on a system clock of the transaction receiver 210 (Block 304). In one embodiment, the transaction receiver 210 may augment the received financial transaction with time signal data immediately or in real time, e.g., upon receipt of the financial transaction.

In one embodiment, the transaction receiver 210 may be able to augment the received financial transactions with time signal data without the entire financial transactions being processed, read, or otherwise analyzed by the transaction receiver 210.

In one embodiment, the operation of the system 200 may further include, augmenting or otherwise ascribing or associating with, by the transaction receiver 210, the received financial transaction with sequence data, such as an ordering or sequence number, indicative of a relationship, temporal or otherwise based on business rules/logic, e.g. a deterministic relationship, between the received financial transaction, e.g. the time of receipt thereof, and any of the plurality of financial transactions, e.g. the times of receipt thereof, previously and/or subsequently received by the transaction receiver 210. The ascribed ordering may then implicitly define the relationship with those transactions received thereafter. In one embodiment, the ordering may be a time stamp or, alternatively, an incremented sequence number. Moreover, the time stamp used for ordering may be based on the time signal data augmented to the transactions. However, as discussed herein, the time signal data may be used by the transaction processors to execute scheduled instructions, in addition to ordering incoming transactions.

The operation of the system 200 further includes receiving, by each of a plurality 206 of transaction processors 208, e.g. match engines, coupled with the transaction receiver 210, such as via the communications infrastructure 202, each of the augmented financial transactions and processing, e.g. apply the business logic/matching algorithm to, the received augmented financial transaction in accordance with the sequence data to determine the change in the current state of the electronic marketplace caused thereby (Block 306). As was described above, the processing is irrespective of the sequence in which each of the augmented financial transactions are received from the orderer, which may be different from the relationship indicated by the sequence data and which may result in a different change in the state of the electronic marketplace.

In one embodiment of the operation of the system 200, the processing of received augmented financial transactions implements a central limit order book of a financial market for at least one financial instrument.

In one embodiment of the operation of the system 200, each of the plurality 206 transaction processors 208 operates asynchronously with respect to the others of the plurality 206 of transaction processors 208, but, if operating properly, process the augmented financial transactions the, same, i.e. according to the sequence data and the applicable business rules. It will be appreciated that transaction processors 208 of set 206 may be added or removed at will.

In one embodiment of the operation of the system 200 the relationship indicated by the sequence data of a particular augmented financial transaction with respect to others of the augmented financial transactions is different from a relationship indicated by the order of receipt by one or more of the plurality of transaction processors of the particular augmented financial transaction with respect to the others of the augmented financial transactions, such as due to underlying processing priorities, transmission and/or routing anomalies, and would result in a different state change in the electronic marketplace.

In one embodiment of the operation of the system 200, each of the financial transactions comprises a request to transact in one of the one or more financial products, the processing of each augmented financial transactions comprising identifying whether a previously processed augmented financial transaction remains incomplete and is counter thereto and, if so, indicating that a transaction there between may be completed, and if not, indicating that data indicative of the availability of the augmented financial transaction be stored in a database.

The operation of the system 200 further includes comparing, by each of the plurality 206 of transaction processors 208, the time signal data in each received augmented financial transaction with scheduled instructions stored in a memory coupled with each transaction processor 208 (Block 308). The scheduled instructions may have been previously received, i.e., prior to the transaction processors 208 receiving the augmented financial transactions. In one embodiment, the transaction processors 208 may compare the time signal data in each received augmented financial transaction with scheduled instructions immediately or in real time, e.g., upon receipt of an augmented financial transaction.

Each transaction processor 208 may be associated with its own memory. Or, the transaction processors 208 may all share a common memory. In one embodiment, each transaction processor 208 stores different scheduled instructions. For example, different transaction processors 208 may be intended to perform different actions in different sequences. The scheduled time data within scheduled instructions associated with different transaction processors may be different. Or, the scheduled instructions may be the same for all of the transaction processors 208.

In one embodiment, upon receipt of a scheduled instruction, the system checks whether a transaction including corresponding time signal data has already been received. If the system determines that a transaction including corresponding time signal data has already been received, the system executes the received instruction. If the system determines that a transaction including corresponding time signal data has not yet been received the system, the received instruction is stored in a coupled memory until the system receives a transaction including the corresponding time signal data.

In one embodiment, the scheduled instructions may include a time limit, such that if corresponding time signal data has not received within the limit, the instruction is either executed or is deleted from the memory at the end of the time limit. The time limit or window may be defined by two different time signals, so that a scheduled instruction may only be executed after a first particular time signal is received and only before a second particular time signal is received, and if the scheduled instruction is received by the system after the window has closed (i.e., after the second particular time signal is received), the system does not thereafter executed that scheduled instruction.

The operation of the system 200 further includes, upon determining, by any one of the plurality 206 of transaction processors 208, that the time signal data in a received augmented financial transaction corresponds to one or more of the scheduled instructions, processing, by the transaction processor 208, the corresponding one or more of the scheduled instructions (Block 310). Thus, the transaction processors may separately determine whether the time signal data in a received augmented financial transaction corresponds to one or more of the plurality of scheduled instructions and upon making that determination, process the corresponding instruction.

In one embodiment, the processing described in connection with Block 310 may include initiating or commencing processing.

As discussed herein, the scheduled instructions received by the plurality 206 of transaction processors 208 may be the same or may be different. Each of the scheduled instructions is associated with a time. The transaction processors 208 are configured to execute the scheduled instruction associated with a time when the time signal data in an augmented financial transaction message corresponds to the time associated with the scheduled instruction.

It should be appreciated that, in one embodiment, the scheduled instructions are not instructions to buy or sell a financial product. The scheduled instructions are instead instructions to perform administrative operations at predetermined, e.g., scheduled, times. Because system 200 augments each received message with time signal data that will be received by each of the transaction processors 208, the system 200 can be implemented to inform each of the transaction processors the time according to the transaction receiver 210. Thus, in one embodiment, the system 200 can be implemented such that each of the transaction processors 208 looks to the time signal data from the transaction receiver 210 as a source of universal time. Because each of the transaction processors 208 can now be expected to receive the transaction receiver 210's notion of time, the transaction processors 208 can be configured to perform tasks at scheduled times.

In one embodiment, the scheduled instructions may be received by the transaction processors before the augmented financial transactions. In one embodiment, the scheduled instructions may be stored in a memory associated with a transaction processor before the transaction processor receives the augmented financial transactions.

The operation of the system 200 may further include receiving, by a result arbiter 212, e.g. a decider as described above, which may be implemented as logic component such as on the same or a different FPGA as the orderer 210, coupled with each of the plurality 206 of transaction processors 208, such as via the communications infrastructure 202, at least one of the determined changes in the state of the electronic marketplace for each processed augmented financial transaction and, based thereon, determining a selected change in the current state of the electronic marketplace for the processed augmented financial transaction and applying the selected change in the current state of the electronic marketplace to update the state of the electronic marketplace, the current state of the electronic marketplace now reflective thereof.

In one embodiment of the operation of the system 200, the transaction receiver 210 and result arbiter 212 are implemented in a network switch coupled with the data link layer/network layer of the communications infrastructure.

In one embodiment of the operation of the system 200, the operation further includes comparing the received determined changes in the state of the electronic marketplace for each processed augmented financial transaction, and determining the selected change in the current state of the electronic market place to be the received determined change in the state of the electronic marketplace for each processed augmented financial transaction provided by, for example, the majority or a quorum of the plurality 206 of transaction processors 208.

In one embodiment, the operation of the system 200 may further include determining that a transaction processor 208 of the plurality 206 of transaction processors 208 is faulty when the determined change in the state of the electronic marketplace for a processed augmented financial transaction received therefrom fails to agree with the determined changes in the state of the electronic marketplace for a processed augmented financial transaction received from at least one other of the plurality 206 of transaction processors 208. The determination may be subject to a time delay threshold defining an amount of time which must elapse without having received a result before a fault is declared. As will be descried, this threshold may be defined so as to prevent determination of a fault when a delayed result is expected, such as when a particular transaction processor 208 is known to be performing maintenance operations or is otherwise busy, offline or deactivated.

For example, in one embodiment of the operation of the system 200, each of the plurality 206 of transaction processors 208 is operative to periodically perform one or more other functions, such as maintenance, e.g. garbage collection, during which augmented financial transactions are not processed or processing is delayed. In this embodiment, each of the plurality 206 of transaction processor 208 may be further configured to not perform the one or more other functions contemporaneously with the performance of the one or more other functions by the remaining of the plurality 206 of transaction processors 208. Alternatively, more than one transaction processor 208 may be allowed to perform other operations assuming a sufficient number are remaining to meet a requisite level of fault tolerance.

In one embodiment of the operation of the system 200, the plurality of financial transactions may further include a plurality of administrative transactions, each of which may or may not cause a change in the current state of the electronic marketplace. Such administrative transactions may include instructions to configure the transaction processors 208, such as to synchronize their operation or cause them to perform maintenance or other operations.

Direct Market Instrumentation

Figure 4:
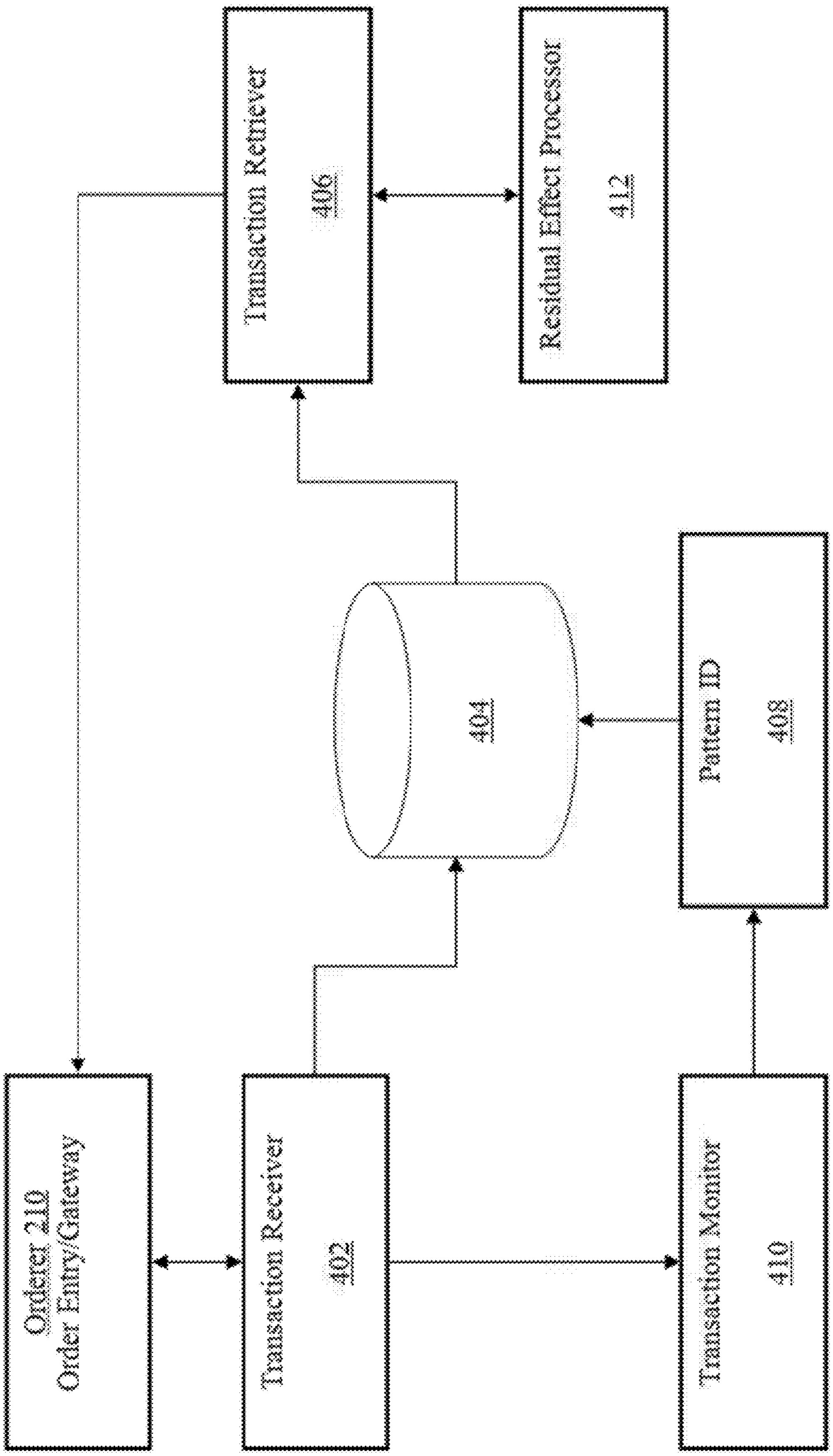
FIG. 4 depicts a block diagram of an exemplary system for reproducing a state of an electronic market place for use with the system of FIG. 1 according to one embodiment.

Referring now to FIG. 4, there is shown a block diagram depicting a system 400 for reproducing a state of an electronic marketplace for one or more financial products resulting from processing, by a financial transaction processing system 100, such as the electronic trading system 100 described herein, of a plurality of financial transactions received from a plurality of market participants, the processing of each of which causes a change in at least an intermediate state of the electronic marketplace. In one embodiment, the system 400 is implemented as part of the matching function 106 of the electronic trading system 100. It will be appreciated that the system 400 may be implemented as part of other functions of the electronic trading system 100, or otherwise coupled with the communications infrastructure 202, which as described above, interconnects the various components of the electronic trading system 100. In one embodiment, the system 400 is implemented as a reconfigurable logic device, e.g. FPGA, coupled with the orderer 210 and/or decider 212 described above and, in one implementation, is implemented on the same FPGA device.

The system 400 includes a transaction receiver 402, which may be implemented as one or more logic components of an FPGA, such as the same FPGA in which the orderer 210 and decider 212 are implemented as described above, or otherwise coupled therewith, such as via the network device backplane. Alternatively, the transaction receiver 402 may be implemented as logic, such as computer program logic, stored in a memory and executable by a processor coupled therewith to cause the processor to act as described. The transaction receiver 402 is coupled with a memory 404, which may be a component of the FPGA or a memory device separate therefrom, and may be implemented as a solid state, magnetic or optical memory device. The transaction receiver 402 is operative to receive each of the plurality of financial transactions and further operative to store data representative thereof in the memory 404.

The system 400 further includes a transaction retriever 406, which may be implemented as the same one or more logic components as the transaction receiver 402 or a different one or more logic components of an FPGA, such as the same FPGA in which the transaction receiver 402 is implemented, the orderer 210 and decider 212 are implemented as described above, or otherwise coupled therewith, such as via the network device backplane. Alternatively, the transaction retriever 406 may be implemented as logic, such as computer program logic, stored in a memory and executable by a processor coupled therewith to cause the processor to act as described. The transaction retriever 402 is coupled with the memory 404 and operative to receive an indication of a state of the electronic market place, such as a specification of a particular state or a state at a given moment in time, to be reproduced and retrieve a subset of the data stored in the memory 404 representative of the plurality of transactions the processing of which would result in the state of the electronic marketplace to be reproduced.

In one embodiment of the system 400, the transaction retriever 406 is further operative to determine a state of the electronic marketplace to be reproduced, retrieve from the memory 404 the stored data representative of the financial transactions necessary to reproduce the state of the electronic marketplace to be reproduced and simulate execution of the transactions represented thereby to generate a simulated electronic marketplace having the reproduced state.

In one embodiment of the system 400, the transaction retriever 406 is further operative to determine a state of the electronic marketplace of interest, such as based on increased market or price volatility, a rapid price spike or decline in for the traded financial product, a trade order or price change velocity increase/decrease or combinations thereof, and further evaluate the stored data to identify two or more subsets of financial transactions the execution of which would result in the state of the electronic marketplace of interest.

In one embodiment of the system 400, the system 400 further includes a pattern identifier 408 which may be implemented as a separate one or more logic components or integrated with the transaction receiver 402 and/or transaction retriever 406, or may be implemented as computer program logic stored in a memory and executable by a processor coupled therewith to cause the processor to perform as described herein. The Pattern identifier 408 is coupled with the transaction retriever 406 and memory 404 and, based on the state of the electronic marketplace, is operative to identify one or more patterns, e.g. indicators or indications, of two or more subsets of financial transactions, such as commonalities there among, e.g. same market participant, orders followed by a cancellation thereof in rapid succession, etc., which resulted in that market state and, for example, may be indicative of fraud, irrational or errant (fat finger) behavior. When a detrimental market event, i.e. a particular change in the state of the market place, is determined to have occurred, such as a rapid price increase or decline, extreme volatility or other event as defined by the operators of the electronic trading system 100, the pattern identifier 408 may analyze the stored transactional data to determine the pattern of transaction activity leading thereto and store data representative of that pattern in pattern memory or buffer to be used to compare against subsequently received transactions to proactively avoid the resultant detrimental effects on the market.

In one embodiment of the system 400, the system 300 further includes a transaction monitor 410 which may be implemented as a separate one or more logic components or integrated with the transaction receiver 402 and/or the transaction retriever 406, or may be implemented as computer program logic stored in a memory and executable by a processor coupled therewith to cause the processor to perform as described herein. The transaction monitor 410 is coupled with the pattern identifier 408 and the transaction receiver and operative to monitor the receipt of each of a future/subsequently received plurality of financial transactions and detect and/or generate an alert when at least a portion of one or more of the patterns occurs therein. In one embodiment, as transactions are received they, or data indicative thereof, are stored/accumulated in a memory or buffer, e.g. a pattern matching buffer (not shown), which is periodically, such as upon receipt of each transaction, compared with one or more stored transactional patterns and if a match is identified, the operators of the electronic trading system 100 are notified, such as via an alert. The pattern matching buffer may implement a sliding window wherein it only holds a fixed number of the most recent transactions wherein, as new transactions are received and stored, the oldest transactions in the buffer are discarded. The buffer may be sized to hold a meaningful number of transactions to detect and react to the particular activities of interest which may only become evident over the course of multiple transactions. In one embodiment, the pattern matching buffer may comprise the input to a content addressable memory ("CAM") wherein the pattern addresses a stored indication of the type of activity the pattern represents. This would permit rapid identification of, as well as response to, activity of interest. A filter may further be provided so that only transaction meeting particular criteria, such as being from a particular market participant and/or for a particular traded financial product, are stored in the buffer for pattern matching.

In one embodiment of the system 400, the transaction retriever 406 is further operative to allow the stored data representative of one or more of a subset of the financial transactions to be modified to modify the one or more financial transaction represented thereby and simulate execution of the subset of financial transactions, including the one or more modified financial transactions, to generate a simulated electronic marketplace having a state resulting therefrom which may be different then the state of the electronic marketplace which would result from execution of the unmodified subset of financial transactions.

In one embodiment of the system 400, the system 400 further incudes a residual effect processor 412 which may be implemented as a separate one or more logic components or integrated with the transaction receiver 402 and/or transaction retriever 406, or may be implemented as computer program logic stored in a memory and executable by a processor coupled therewith to cause the processor to perform as described herein. The residual effect processor 412 is coupled with the transaction retriever 406 and operative, for a particular state of the electronic marketplace, determine the stored data representative of all of the financial transactions which contributed to achieving the particular state, or conversely, all of the transactions which did not contribute to the particular state. This data may then be used to identify only those transactions, out of all of the stored transactions which may be intertwined therewith, necessary to replicate a particular market state, reducing the number of transactions necessary to be simulated to reproduce that state.

It will be appreciated that reexecution, e.g. replay, of stored transactions may be accomplished by reexecuting those transactions through the match engines as though they had been received via the normal operation of the electronic trading system, such as by submitting each transaction through the orderer 210. This could then be used to further test the electronic trading system 100 for deterministic behavior by confirming that the result of the reexecution of transactions yields the same result as when those transactions were first executed. Alternatively, transactions may be reexecuted on separate, e.g. test, match engines or simulations or models thereof.

Figure 5:
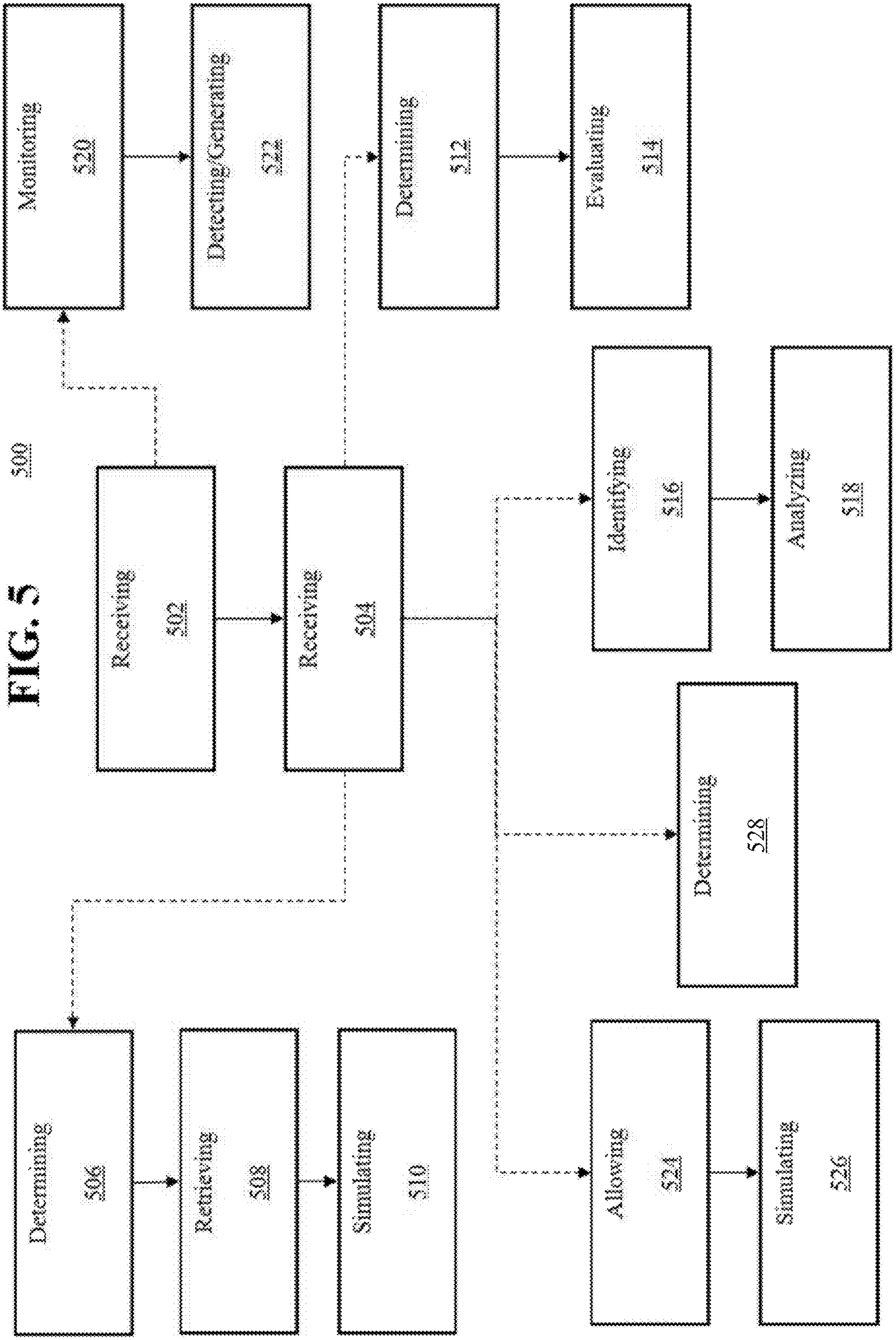
FIG. 5 depicts a flow chart showing operation of the system of FIG. 4 according to one embodiment.

FIG. 5 depicts a flow chart 500 showing operation of the system 400 of FIG. 4. In particular FIG. 5 shows a computer implemented method for reproducing a state of an electronic marketplace for one or more financial products resulting from processing, by a financial transaction processing system, of a plurality of financial transactions received from a plurality of market participants, the processing of each of which causes a change in at least an intermediate state of the electronic marketplace. The operation of the system 400 includes: receiving, by a processor, such as a logic component of a reconfigurable logic device, e.g. FPGA, coupled with a memory, each of the plurality of financial transactions and operative to store data representative thereof in the memory (Block 502); and receiving, by the processor, i.e. the same or different logic component, an indication of a state of the electronic market place, e.g. a specification of a particular state or a state at a given moment in time, to be reproduced and retrieving a subset of the data stored in the memory representative of the plurality of transactions the processing of which would result in the state of the electronic marketplace to be reproduced (Block 504).

In one embodiment of the operation of the system 400, the operation further includes determining a state of the electronic marketplace to be reproduced (Block 506), retrieving from the memory 404 the stored data representative of the financial transactions necessary to reproduce the state of the electronic marketplace to be reproduced (Block 508) and simulating execution of the transactions represented thereby to generate a simulated electronic marketplace having the reproduced state (Block 510).

In one embodiment of the operation of the system 400, the operation further includes determining a state of the electronic marketplace of interest, such as based on increased market or price volatility, a rapid price spike or decline in for the traded financial product, a trade order or price change velocity increase/decrease or combinations thereof, (Block 512) and further evaluating the stored data to identify two or more subsets of financial transactions the execution of which would result in the state of the electronic marketplace of interest (Block 514).

In one embodiment of the operation of the system 400, the operation further includes identifying one or more patterns, e.g. indicators or indications, of two or more subsets of financial transactions, such as commonalities there among, e.g. same market participant, orders followed by a cancellation thereof in rapid succession, etc., which resulted in that market state and, for example, may be indicative of fraud, irrational or errant (fat finger) behavior (Block 516). When a detrimental market event, i.e. a particular change in the state of the market place, is determined to have occurred, such as a rapid price increase or decline, extreme volatility or other event as defined by the operators of the electronic trading system 100, the operation of the system 400 may include analyzing the stored transactional data to determine the pattern of transaction activity leading thereto and store data representative of that pattern in pattern memory or buffer to be used to compare against subsequently received transactions to proactively avoid the resultant detrimental effects on the market (Block 518).

In one embodiment of the operation of the system 400, the operation may further include monitoring the receipt of each of a future/subsequently received plurality of financial transactions and (Block 520) detecting and/or generating an alert when at least a portion of one or more of the patterns occurs therein (Block 522). In one embodiment, as transactions are received they, or data indicative thereof, are stored/accumulated in a memory or buffer, e.g. a pattern matching buffer (not shown), which is periodically, such as upon receipt of each transaction, compared with one or more stored transactional patterns and if a match is identified, the operators of the electronic trading system 100 are notified, such as via an alert. The pattern matching buffer may implement a sliding window wherein it only holds a fixed number of the most recent transactions wherein, as new transactions are received and stored, the oldest transactions in the buffer are discarded. The buffer may be sized to hold a meaningful number of transactions to detect and react to the particular activities of interest which may only become evident over the course of multiple transactions. In one embodiment, the pattern matching buffer may comprise the input to a content addressable memory ("CAM") wherein the pattern addresses a stored indication of the type of activity the pattern represents. This would permit rapid identification of, as well as response to, activity of interest. A filter may further be provided so that only transaction meeting particular criteria, such as being from a particular market participant and/or for a particular traded financial product, are stored in the buffer for pattern matching.

In one embodiment of the operation of the system 400, the operation further includes allowing the stored data representative of one or more of a subset of the financial transactions to be modified to modify the one or more financial transaction represented thereby (Block 524) and simulating execution of the subset of financial transactions, including the one or more modified financial transactions, to generate a simulated electronic marketplace having a state resulting therefrom which may be different then the state of the electronic marketplace which would result from execution of the unmodified subset of financial transactions (Block 526).

In one embodiment of the operation of the system 400, the operation includes, for a particular state of the electronic marketplace, determining the stored data representative of all of the financial transactions which contributed to achieving the particular state, or conversely, all of the transactions which did not contribute to the particular state (Block 528). This data may then be used to identify only those transactions, out of all of the stored transactions which may be intertwined therewith, necessary to replicate a particular market state, reducing the number of transactions necessary to be simulated to reproduce that state.

Unattached Order Books

As was described above, in one embodiment of the disclosed electronic trading system architecture, multiple generic match engines 106, or redundant match engine sets 206/208, as described above, are provided which are capable of processing a transaction for any of the markets provided by the electronic trading system. All of the order books may be maintained in a centrally accessible memory architecture. As incoming orders are received, they may be allocated or otherwise disseminated to one of the generic match engines (or match engine sets). To determine which match engine (or set) to send the transaction for processing, the system may determine the outright and all related order books to the given transaction. If the identified order books have not yet been allocated to a match engine (or set thereof), an available match engine (or set) is selected, the identified order books, and in one embodiment the match policy/algorithm to be applied, are allocated and the incoming transaction is routed thereto. If the identified order books are already allocated to one of the match engines (or sets), the incoming order is routed to that match engine (or set). During transaction processing, the match engine (or set) accesses and updates the order books as needed to perform the matching and implication functions as described. When the match engine (or set) has completed processing of all transactions, before another transaction is routed thereto, it relinquishes its allocation of the identified order books, and is then available for a new transaction for a new set of identified order books.

This enables, for example, computation of implied matches and/or opportunities via access to all of the interdependent order books necessary so as to be able to identify suitable markets and actual or hypothetical resting orders therein which permit a given transaction to be completed. The central storage an allocation of order books, effectively on demand, to any of a set of generic match engines overcomes the limited data storage capacity and/or bandwidth of existing match engines, improving liquidity and the variety of product offerings, as well as transaction throughput and fault tolerance.

In one embodiment, the allocation of identified order books may further include allocation of a defined matching policy/algorithm to be applied by the match engine (or set). This allows different matching algorithms to be used by each match engine.

As will be described, allocation of the identified order books may be implemented by actually transferring the data representative thereof to a memory associated with the selected match engine and then transferring the updated order books back to the central memory upon deallocation. Alternatively, access to the central memory and, further, to the identified order books, may be allocated such as by providing the memory address locations of identified order books in the central memory to the selected match engine (or set), such as via provision of a sparse matrix or other data structure which comprises the identification of the requisite memory locations. Updates to the order books in the central memory may then be accomplished via remote direct memory access ("RDMA") or other back channel network based memory access. It will be appreciated other storage resource sharing mechanisms may be utilized, such as non-uniform memory architecture (NUMA) compliant mechanisms, structured or unstructured databases, such as tag clouds, etc.

The disclosed embodiment, thereby, provide for fungible generic match engines which can handle independent/unrelated markets in parallel. In one embodiment, the number of generic match engines (or sets thereof) may be set so as to statistically minimize transaction latency among transactions to independent/unrelated markets. Order books may be only tied to a given match engine (or set) for the duration of the order processing of transactions therein. By altering the degree of interdependencies computed to identify related order books, parallelism among transaction processing and/or liquidity/trading opportunities can be balanced.

Coordination Message

Figure 6:
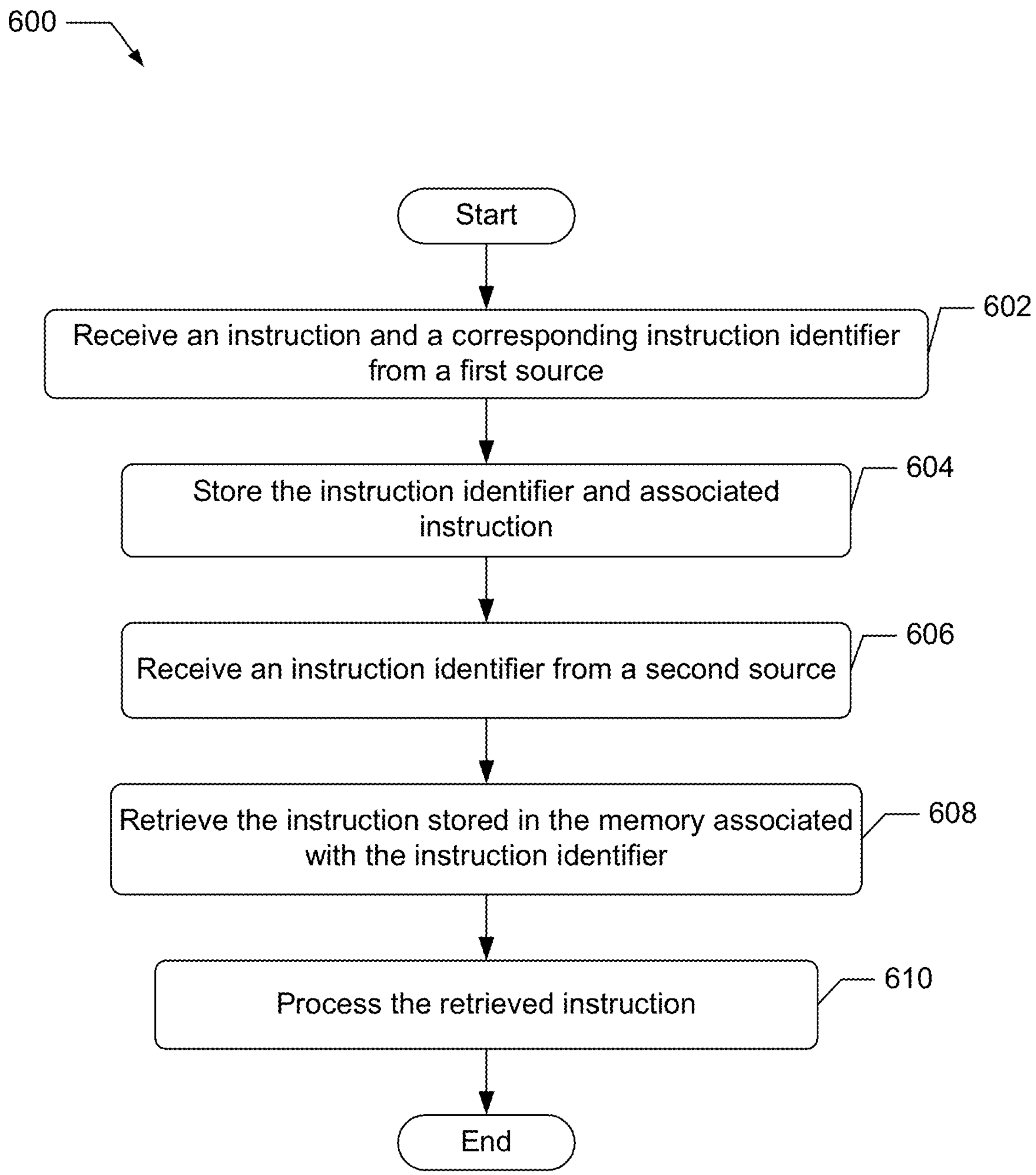
FIG. 6 depicts a flow chart showing another operation of the system of FIG. 1 according to one embodiment.

FIG. 6 depicts a flow chart 600 showing operation of the system 200 of FIG. 2. In particular FIG. 6 shows a computer and/or FPGA implemented method for processing a plurality, e.g. a series or sequence, of instructions, such as orders to open the market for a financial product, or to perform garbage collection, received via a network, such as the network 126 of FIG. 1, from a system component, e.g., Administrative Systems 216, the processing of each instruction operative to cause a change in an operation of the transaction processor. In one embodiment, an administrative instruction sent from with the exchange computing system to other components may comprise an instruction that:

modifies a physical configuration of a transaction processor, such as garbage collection details, what ports should be utilized, how many CPUs should be utilized, or how much RAM should be utilized; or modifies a functional configuration of a transaction processor, such as indicating why types of orders should be allowed, which types of orders should be rejected, which market should be processed, which asset should be processed, whether pre-opening transactions should be processed, and velocity logic configurations. See, for example, U.S. Pat. No. 8,660,936, entitled "Detection and mitigation of effects of high velocity price changes" ("the '936 Patent"), including examples of velocity logic implemented in an exchange computing system, the entire disclosure of which is incorporated by reference herein and relied upon.

The operation of the system 200 includes receiving, by a transaction processor, an instruction and a corresponding instruction identifier from a first source (Block 602). The first source may be an instruction generator 216. For example, the instruction and corresponding instruction identifier may be generated by an instruction generator 216, e.g., Administrative systems 216. Each instruction identifier may be unique to its corresponding instructions. A system component, e.g., the transaction processor, could retrieve or identify an instruction based on an instruction identifier identifying or associated with the instruction. The disclosed embodiments may be configured to store instruction identifiers and corresponding instructions in a database, for example.

The instruction identifiers are typically smaller in size the corresponding instructions. For example, each instruction may include multiple fields, one of which may be the instruction identifier. Thus, it may be quicker to send instruction identifiers from one component to another instead of sending an entire instruction. The system may include a plurality 206 of transaction processors 208, e.g. match engines, that may be coupled with the instruction generator 216, such as via the communications infrastructure 202. The operation of the system 200 further includes storing, in a memory coupled with the transaction processor 208, the instruction identifier and associated instruction (Block 604).

In one embodiment, instead of receiving instructions and instruction identifiers, a transaction processor may share a memory with the instruction generator. The instruction generator may write instructions and instruction identifiers into the stored memory, and the instructions and instruction identifiers would then be available for the transaction processor to read therefrom.

The operation of the system 200 further includes receiving, by the transaction processor 208, e.g. match engine, an instruction identifier from a second source (Block 606). The second source may be a transaction receiver 210.

The operation of the system 200 further includes retrieving by the transaction processor instructions stored in the memory associated with the instruction identifier (Block 608).

If the system includes multiple transaction processors, each transaction processor may store instructions in a separate memory dedicated to that transaction processor. Alternatively, the transaction processors may share access to a shared memory that stores instructions and instruction identifiers for all of the transaction processors.

The operation of the system 200 further includes processing the retrieved instruction (Block 610). The processing may cause a change in the operation of the transaction processors 208.

In one embodiment, the instruction generator 216 may generate a plurality of instructions and corresponding instruction identifiers. The operation of the system 200 may further include receiving, by the transaction receiver 210 from the network 126, such as via the interconnection infrastructure 202, each of the plurality of instruction identifiers from the instruction generator 216. Thus, it should be appreciated that in one embodiment, instruction generator 216 generates instructions and instruction identifiers, but only sends the instruction identifiers to the transaction receiver 210. In contrast, the instruction generator 216 may send both the instructions and instruction identifiers to the transaction processors 208.

As was described above, the processing is irrespective of the sequence in which each of the corresponding augmented instruction identifiers are received from the orderer, which may be different from the relationship indicated by the sequence data and which may result in a different change in the operation of the transaction processors 208.

In one embodiment, the operation of the system 200 further includes augmenting, by the transaction receiver 210, the received instruction identifier with sequence data, such as an ordering or sequence number, indicative of a relationship, temporal or otherwise based on business rules/logic, e.g. a deterministic relationship, between the received instruction identifier, e.g. the time of receipt thereof, and any of the plurality of instruction identifiers, e.g. the times of receipt thereof, previously and/or subsequently received by the transaction receiver 210. The ascribed ordering may then implicitly define the relationship with those instruction identifiers received thereafter. In one embodiment, the ordering may be a time stamp or, alternatively, an incremented sequence number. Moreover, the time stamp used for ordering may be based on the time signal data augmented to the instruction identifiers.

The transaction processor may retrieve and process the instructions in accordance with the sequence data to determine the change in the operation of the transaction processor 208 caused thereby. Thus, the sequence data which the transaction receiver 210 may augment or add to the instruction identifiers imparts an ordering which is to be followed by the transaction processor when the transaction processor retrieves and process the instruction associated with the augmented instruction identifier.

In one embodiment of the operation of the system 200, each of the plurality 206 transaction processors 208 operates asynchronously with respect to the others of the plurality 206 of transaction processors 208, but, if operating properly, process the instructions associated with the augmented instruction identifiers the, same, i.e. according to the sequence data and the applicable business rules. It will be appreciated that transaction processors 208 of set 206 may be added or removed at will.

In one embodiment of the operation of the system 200, the relationship indicated by the sequence data of a particular augmented instruction identifier with respect to others of the augmented instruction identifiers is different from a relationship indicated by the order of receipt by one or more of the plurality of transaction processors of the particular augmented instruction identifier with respect to the others of the augmented instruction identifiers, such as due to underlying processing priorities, transmission and/or routing anomalies, and would result in a different change in the operation of the transaction processors 208.

It should be appreciated that, in one embodiment, the instructions are not instructions to buy or sell a financial product. The instructions are instead instructions to perform administrative operations upon receipt of a corresponding augmented instruction identifier.

The operation of the system 200 may further include receiving, by a result arbiter 212, e.g. a decider as described above, which may be implemented as logic component such as on the same or a different FPGA as the orderer 210, coupled with each of the plurality 206 of transaction processors 208, such as via the communications infrastructure 202, at least one of the determined changes in the operation of the transaction processors 208 for each processed augmented instruction and, based thereon, determining a selected change in the current operation of the transaction processors 208 for the processed instruction corresponding to the augmented instruction identifier and applying the selected change in the current operation of the transaction processors 208 to update the state of the operation of the transaction processors 208, the current operation of the transaction processors 208 now reflective thereof.

In one embodiment of the operation of the system 200, the transaction receiver 210 and result arbiter 212 are implemented in a network switch coupled with the data link layer/network layer of the communications infrastructure.

In one embodiment of the operation of the system 200, the operation further includes comparing the received determined changes in the operation of the transaction processors 208 for each processed instruction corresponding to an augmented instruction identifier, and determining the selected change in the current operation of the transaction processors 208 to be the received determined change in the operation of the transaction processors 208 for each operation of the transaction processors 208 provided by, for example, the majority or a quorum of the plurality 206 of transaction processors 208.

In one embodiment, the operation of the system 200 may further include determining that a transaction processor 208 of the plurality 206 of transaction processors 208 is faulty when the determined change in the operation of the transaction processors 208 for a processed instruction corresponding to an augmented instruction identifier received therefrom fails to agree with the determined changes in the operation of the transaction processors 208 for a processed instruction corresponding to an augmented instruction identifier received from at least one other of the plurality 206 of transaction processors 208. The determination may be subject to a time delay threshold defining an amount of time which must elapse without having received a result before a fault is declared. As will be descried, this threshold may be defined so as to prevent determination of a fault when a delayed result is expected, such as when a particular transaction processor 208 is known to be performing maintenance operations or is otherwise busy, offline or deactivated.

Figure 7:
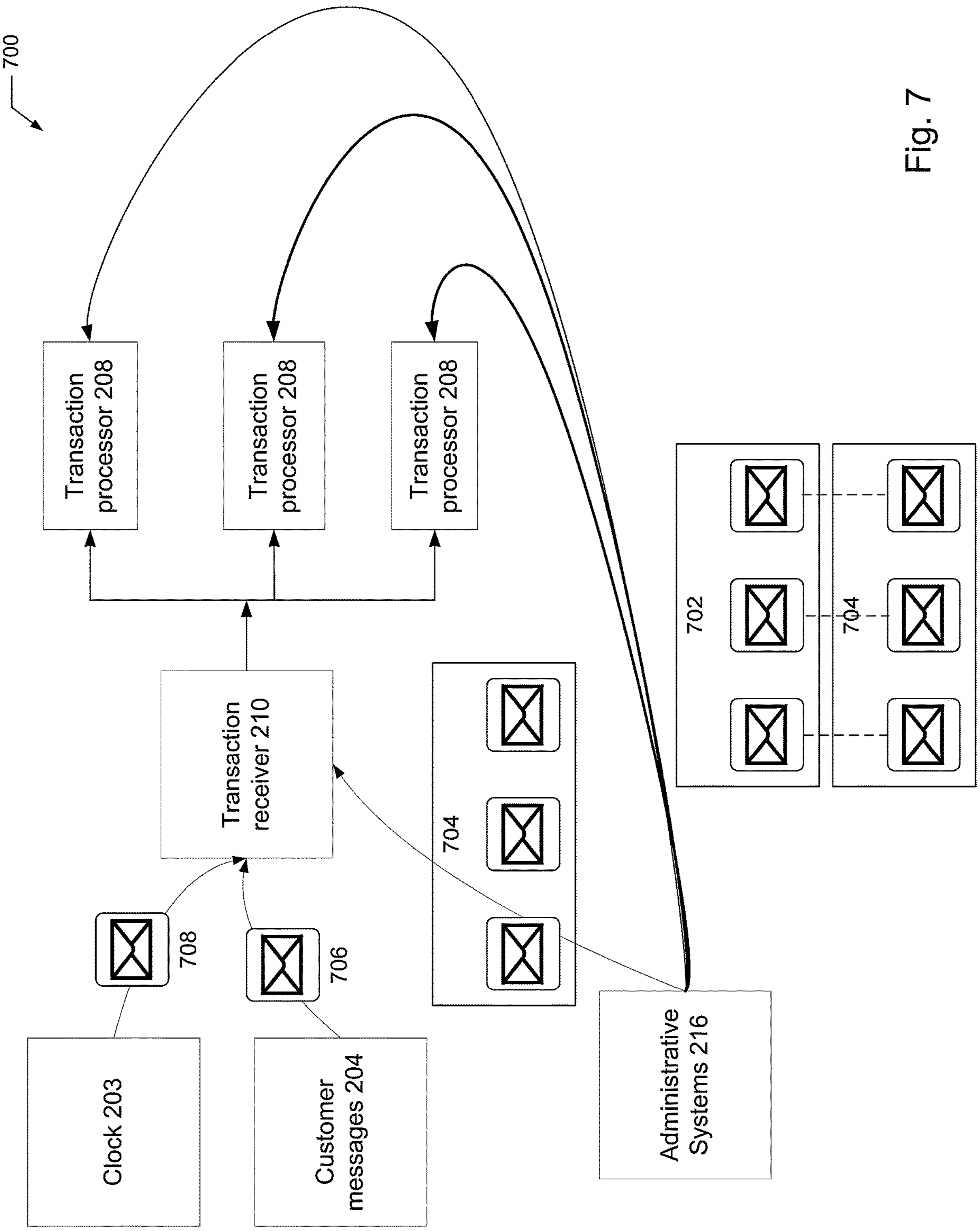
FIG. 7 depicts a block diagram illustrating data flow between components of an exemplary implementation of the system of FIG. 1 according to one embodiment.

FIG. 7 illustrates an example system 700 including certain components of the systems of FIGS. 1 and/or 2. System 700 may be the same as systems 100 and 200. As shown in FIG. 7, the transaction receiver 210 may receive messages from several sources with the exchange computing system. The sources may include clock 203, customer messages 204, and administrative systems 216. The clock 203 may be a hardware unit, such as the Solarflare Precision Time Protocol (PTP)™ hardware. Clock 203 provides a single source of time, which, as described herein, is used to augment messages with time signal data. Customer messages 204 may send financial transactions to transaction receiver 210 which include instructions to buy or sell a financial product and which cause a change in the state of an electronic marketplace associated with the financial product. Administrative systems 216 may send physical and functional configuration data to transaction receiver 210 that modifies a physical configuration of a transaction processor (such as garbage collection details, what ports should be utilized, how many CPUs should be utilized, or how much RAM should be utilized), or that modifies a functional configuration of a transaction processor (such as indicating why types of orders should be allowed, which types of orders should be rejected, which market should be processed, which asset should be processed, whether pre-opening transactions should be processed, and velocity logic configurations).

Transaction receiver 210 receives and sequences all of the messages it receives from the multiple sources. Transaction receiver 210 may also add time signal data to each received message. The transaction receiver 210 then sends each message to the multiple transaction processors 208. The transaction processors 210 process each received message, and may process them differently depending upon the message type. For example, when a transaction processor 208 receives and processes financial transactions, submitted by customer computers, e.g., customer messages 204, the state of an electronic marketplace may be modified. When a transaction processor 208 receives and processes an administrative instruction submitted by Administrative systems 216, the operation of the transaction processor 208 may be modified.

As illustrated in FIG. 7, a system component, e.g., administrative systems 216 may be configured to submit data, e.g., messages, to the transaction processors 208 without needing to submit the data, e.g., pass the message, through, or resulting in the message being processed by, the transaction receiver 210. In other words, the disclosed embodiments include a system where the transaction processors 208 are configured to receive data from other components, e.g., Administrative systems 216, through a variety of distinct paths, namely, one path including the transaction receiver 210 which sequences/orders/augments messages as discussed herein, and another path not including the transaction receiver 210.

The transaction receiver 210 in one embodiment may be a single point of message receipt, so that all messages regardless of source pass through or are processed by the transaction receiver 210. The messages from the different sources may vary in size or complexity, so that some messages can be time stamped and processed (e.g., ordered, sequenced, or augmented) quicker than others. In particular, customer messages sent by customer computers to perform an action on a financial product and that, when processed by a transaction processor, cause a change in the state of an electronic marketplace, e.g., order book, for the financial product, i.e., financial transactions, may be relatively simple or quick to process compared to administrative instructions that, when processed by a transaction processor, cause a change in the operation of the transaction processor. Accordingly, system 700 may be configured so that the Administrative systems 216 submits related messages to both the transaction processors 208 and the transaction receiver 210. In particular, Administrative systems 216 may generate instructions 702 and corresponding instruction identifiers 704. In FIG. 7, corresponding pairs of instructions 702 and instruction identifiers 704 are illustrated as connected via dashed lines.

As shown in FIG. 7, Administrative systems 216 transmits the corresponding pairs of instructions 702 and instruction identifiers 704 to the transaction processors 208. Administrative systems 216 also transmits instruction identifiers 704 to the transaction receiver 210. The transaction receiver 210 may receive the instruction identifiers 704 as well as financial transactions 706 from customer messages component 204 and time signal data messages 708 from clock 203. The transaction receiver 210 may receive streams of data from multiple sources, e.g., all three data message sources in exemplary FIG. 7, namely 216, 204 and 203, so that the received messages are interweaved into a combined stream of heterogeneous data. The transaction receiver 210 may augment and process the combined stream of interweaved heterogeneous data in the order of receipt as described herein. For example, the transaction receiver 210 may process messages sequentially, or in a first in, first out (FIFO) manner.

In one embodiment, upon augmenting/processing the received messages, the transaction receiver 210 may transmit the augmented messages to the transaction processors 208. The data communication channel between the transaction receiver 210 and transaction processors 208 may be minimally process intensive, e.g., the transaction processors 208 receive messages from the transaction receiver 210 substantially instantaneously.

For example, in one embodiment, the transaction processors 208 may share a serial/bus connection with the orderer/transaction receiver 210. A message or transaction transmitted by the orderer to the transaction processors would not be able to overtake another message. In other words, a series of transactions transmitted by the transaction receiver 210 in a given sequence would be received by each transaction processor in the same sequence. However, the series of transactions may be received by the transaction processors at different absolute times.

However, the transaction processors 208 may be configured differently (e.g., the physical and/or functional configuration discussed herein), so that they receive messages from the transaction receiver 210 at different times. For example, in one embodiment, each transaction processor 208 may have a separate dedicated connection to the transaction receiver 210. Thus, a series of transactions transmitted by the transaction receiver 210 in a given sequence could be received by each transaction processor in a different sequence. In one embodiment, even if the transaction processors 208 share a serial/bus connection with the orderer/transaction receiver 210, the transactions may be split up into pieces and interleaved, which are then re-assembled by transaction processors 208 in the proper format/message.

It should be appreciated that the combination of the transaction receiver 210 and a bus architecture (where all the match engines pull data from the orderer off a bus architecture) ensures that the transaction processors 208 (e.g., match engines) receive messages (e.g., financial transactions, instruction identifiers, etc.) in the same order. In particular, in one embodiment, the orderer may ensure that all messages received from different sources will be sent to the bus in the order in which they arrived to the orderer. The bus architecture guarantees delivery order to all consumers (e.g., transaction processors 208) as long as there is only a single publisher to that bus. Thus, in one embodiment, the orderer/bus combination architecture guarantees order, so it is not possible for the match engines to receive anything in a different order. A message might be processed by one match engine slightly ahead or slightly behind as compared to how that message is processed by another match engine, but in one embodiment, the system may be configured so that all the match engines will have processed all messages in the exact same order, thus resulting in the exact same state.

In one embodiment, one of the transaction processors 208 may be configured to be optimized for one type of message (e.g., financial transactions 706) while another of the transaction processors 208 may be configured to be optimized for another type of message (e.g., instruction identifiers 704 or instructions 702). In one embodiment, a transaction processor 208 optimized for a message type prioritizes processing that message type over any other message type.

Upon receiving an augmented instruction identifier 704, a transaction processor 208 may look up the instruction 702, which the transaction processor 208 has already previously received directly from Administrative systems 216, corresponding to the augmented instruction identifier 704. Thus, in one embodiment, the transaction processor 208 may be configured to be able to identify an instruction and an instruction identifier corresponding to an augmented instruction identifier.

As discussed herein, the transaction processors 208 may be configured to store instructions, and not immediately process instructions, upon receiving instructions from the Administrative systems 216. In contrast, the transaction receiver 210 may be configured to immediately process any received message. Thus, system 700 may be configured to pre-load, or pre-cache, or pre-send an instruction 702 (along with the corresponding instruction identifier 704) to the transaction processor 208, with the expectation that the corresponding instruction identifier 702 will be transmitted to the transaction receiver 210 when it is desired to process the instruction 702. In other words, transaction processor 208 receives instructions and instruction identifiers, but does not process instructions until the corresponding augmented instruction identifier is received from the transaction receiver 210.

The disclosed embodiments accordingly can be configured to transmit instructions 702 and corresponding instruction identifiers 704 from a component, e.g., Administrative systems 216, to the transaction processors 208 at a first time, and at a second, later time, when it is determined that transaction processor 208 should process an instruction 702, transmit the instruction identifier 704 corresponding to the instruction 702 from the component, e.g., Administrative systems 216, to the transaction receiver 210. The transaction receiver 210, upon receiving the instruction identifier, processes/augments the received instruction identifier and transmits the augmented instruction identifier to the transaction processor 208. The transaction processor 208, upon receiving the augmented instruction identifier, retrieves the instruction corresponding to the received augmented instruction identifier (which may or may not require identifying the instruction identifier corresponding to the augmented instruction identifier) and, upon retrieving the instruction corresponding to the received augmented instruction identifier, processes the retrieved instruction.

The transmitting of an instruction identifier 704 from a component, e.g., Administrative systems 216, to the transaction receiver 210 may thus be a trigger indicating that the corresponding instruction 702 should be processed by the transaction processor 208.

Because transmitting an instruction from a component, e.g., Administrative systems 216, to the transaction processors 208 may require much more time than retrieving an instruction already/previously received by the transaction processors 208, the disclosed instruction/instruction identifier data flow over multiple paths may reduce the overall latency and delay experienced by system 700, increasing processing speed, eliminating wasted time/delays, and improving computing efficiency.

Figure 8:
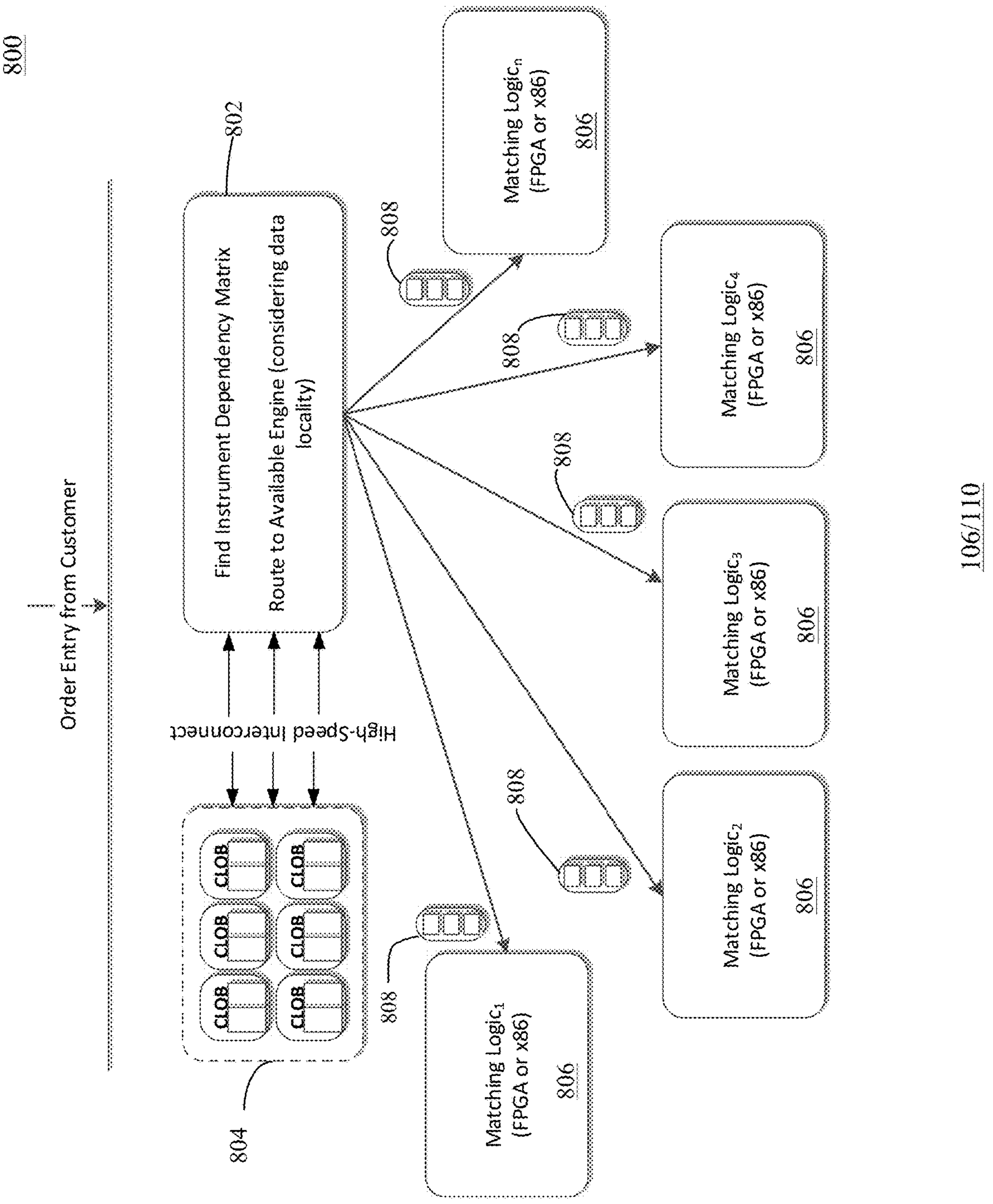
FIG. 8 depicts a block diagram of a system for improving the efficiency of an electronic trading system as shown in FIG. 1 according to one embodiment.

Referring now to FIG. 8 there is shown a block diagram of a system 800, which may also be referred to as an architecture, according to one embodiment, for improving efficiency of an electronic trading system 100 for a plurality of financial instruments, each of the plurality of financial instruments, e.g. futures, options contracts, a single contract therefore or a strategy/combination of contracts, such as a spread, wherein each associated financial instrument comprises at least one component wherein, for example, for a futures or options contract, the component is the contract itself and for a strategy/combination contract having more than one component wherein the components are the leg orders/contracts/instruments thereof, as was described above. As described above, the electronic trading system 100 may include a plurality of generic match engines 806 coupled therewith, each of which may be a conventional match engine 106 which receives orders via an order entry gateway (not shown), or, as described above, may be a redundant match engine set 206 receiving orders via an orderer 210 as described above, or may be a match engine or match function having an alternative architecture. As used herein, a "match engine" 106 refers to either a conventional match engine or a redundant set of match engines as described. As will be described, each of the plurality of match engines, i.e. conventional or redundant sets, implements at least one market, or order book representative thereof, for an associated financial instrument, e.g. futures, options contracts, a single contract therefore or a strategy/combination of contracts, such as a spread, wherein each associated financial instrument comprises at least one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied.

Figure 9:
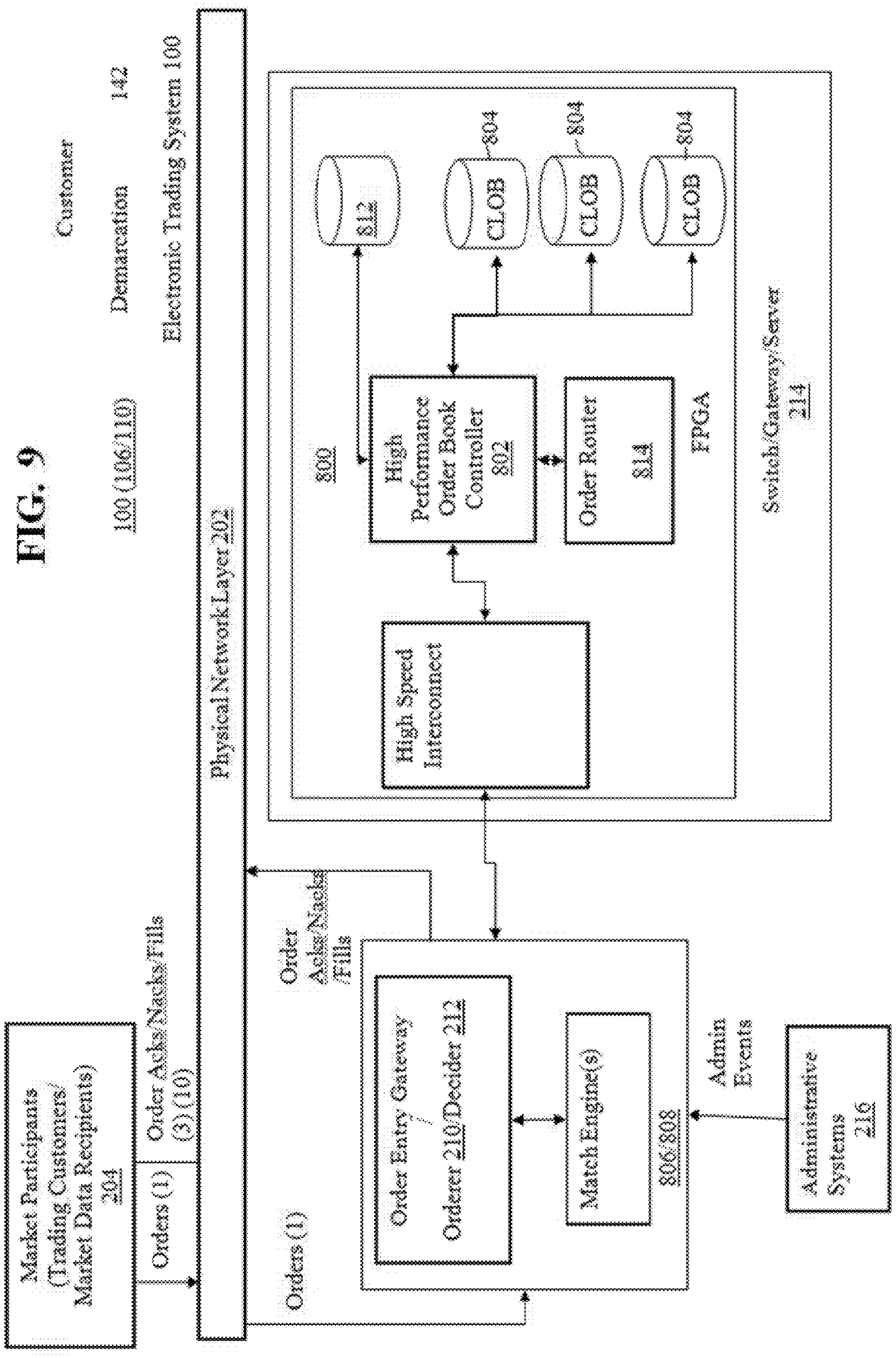
FIG. 9 depicts a more detailed block diagram of a system for improving the efficiency of an electronic trading system as shown in FIG. 1 according to one embodiment.

As shown in FIG. 9, in one embodiment, the system 800 is implemented as a reconfigurable logic device, e.g. FPGA, and coupled with the match engines 806. For example, in one implementation, the system 800 may be coupled with the orderer 210 and/or decider 212 described above and, may further be implemented on the same FPGA device. In one embodiment, the system 800 is implemented as part of the matching function 106 of the electronic trading system 100. It will be appreciated that the system 800 may be implemented as part of other functions of the electronic trading system 100, or otherwise coupled with the communications infrastructure 202, which as described above, interconnects the various components of the electronic trading system 100. In one embodiment, the system 802 is implemented as a reconfigurable logic device, e.g. FPGA, coupled with the orderer 210 and/or decider 212 described above and, in one implementation, is implemented on the same FPGA device.

The system 800 includes a memory 804, e.g. an order book memory, operative to store data representative of a set of previously received but unsatisfied orders, e.g. which may be grouped into order books, such as by product for which the order is for, each order being for a transaction, which may specify side (buy/sell), price and/or quantity, for at least one of the plurality of financial instruments. The memory 804 may be implemented as a memory component of a reconfigurable logic device, e.g. an FPGA, as described above, or alternatively implemented using another type of memory or storage device, such as the memory 1104 or storage device 1106 described below with respect to FIG. 11.

The system 800, as described above, further includes, or is otherwise coupled with, a plurality of match engines 806 coupled with the memory 804, each of the plurality of match engines may be generic, fungible or otherwise non-order/non-match-algorithm specific, and further operative to implement, as described above, at least one market, e.g. order book, for an associated a financial instrument, such as a futures or options contract, or other single contract or strategy/combination of contracts, of the plurality of financial instruments. Each match engine 806 being further operative to attempt to match, e.g. according to a match algorithm/policy, an incoming order provided or otherwise routed or directed thereto for a transaction, which may have been received from a market participant 204 or other source, which as described above may specify side (buy/sell), price and/or quantity, for the associated financial instrument with at least one other of the set of previously received but unsatisfied, e.g. unmatched or only partially filled, orders, the at least one other previously received but unsatisfied order being for a transaction counter thereto for a financial instrument of the plurality of financial instruments having at least one component in common with the financial instrument of the incoming order, to at least partially satisfy, e.g. fill, one or both of the incoming order or the at least one other previously received order. Each match engine 806 is then further operative to update or otherwise, e.g. to add the incoming order and/or update the stored counter order, the stored data, e.g. the order book, in the memory 804, as will be described, representative of the set of previously received but unsatisfied orders based thereon.

In one embodiment, the set of previously received but unsatisfied orders further may further include, or otherwise may be subdivided into one more financial instrument subsets, each financial instrument subset, e.g. order book, comprising those previously received orders of the set which are for a transaction for the same financial instrument of the plurality of financial instruments, wherein the order book allocator 802 is further operative to determine the subset of the set of previously received but unsatisfied orders by identifying those financial instrument subsets associated with financial instruments having at least one component thereof, e.g. are interdependent, in common with each other and the financial instrument of the incoming order. In this way all interdependent order books may be allocated to the particular selected match engine 806 which, as will be described above and further below, may facilitate implication. For example, in one embodiment, each of the plurality of match engines 806 may be further operative to attempt to identify an implied match for the incoming order among the orders of the allocated subset for financial instruments, described below, which are not identical to the financial instrument of the incoming order.

In one embodiment, each of the plurality of match engines 806 may be operative to update the stored data in the memory 804 using a back channel protocol. Alternatively, each of the plurality of match engines 806 may be operative to update the stored data in the memory 804 using a remote direct memory access ("RDMA") protocol.

In one embodiment, the plurality of match engines 806 includes sufficient match engines 806 such that a match engine 806 is always available to have routed thereto an incoming order associated with an unallocated subset of the set of previously received but unsatisfied orders.

The system 800 further includes an order book allocator 802, which may also be referred to as an order router and/or balancer and which may be implemented as one or more logic components of an FPGA, such as the same FPGA in which the orderer 210 and decider 212 are implemented as described above, or otherwise coupled therewith, such as via the network device backplane. Alternatively, the order book allocator 802 may be implemented as logic, such as computer program logic, stored in a memory and executable by a processor coupled therewith to cause the processor to act as described. The order book allocator 802 is coupled with the memory 804 and the plurality of match engines 806 and operative to, upon receipt of an incoming order from a market participant 204 for a transaction for a financial instrument, determine a subset of the set of previously received but unsatisfied orders each having at least one component of the associated financial instrument in common with the financial instrument of the incoming order, and determine if access to the subset has been previously allocated, e.g. accorded, provided or otherwise granted, to one of the plurality of match engines 806, which may imply that the incoming order is related to a prior order which is still undergoing the match process, and, where access to the subset has been previously allocated to one of the plurality of match engines 806, route, or otherwise provide, the incoming order thereto for a match attempt thereby, and wherein access to the subset has not been allocated to one of the match engines 806, select one of the plurality of match engines 806, allocate access to the subset to the selected match engine 806 and route the incoming order to the selected match engine 806 for a match attempt thereby. In one embodiment, the allocation of the subset may include transferring at least a copy of the subset to a memory 808, e.g. a cache or other local memory, associated with the selected match engine 806.

In one embodiment, the order book allocator 802 is operative to facilitate access to the subset by providing the data representative thereof to the particular match engine 806 for use thereby and retrieving the data representative of the subset from the match engine 806 subsequent to the updating thereby.

In one embodiment, the order book allocator 802 is further operative to deallocate access to the subset when the selected match engine 806 has completed the attempt to match all incoming orders routed thereto prior to another incoming order being routed thereto.

In one embodiment, the order book allocator 802 may further maintain a data structure or database 812, which may be a sparse matrix or array, which stores data representative of which financial instruments of the plurality of financial instruments have at least one component thereof in common with another of the financial instruments of the plurality of financial instruments, which financial instruments, and thereby which order books, are interdependent. This data structure 812 may further store the locations in the memory 804 in which each of the set of previously received but unsatisfied orders is stored, which as described above, may be subdivided, logically and/or physically, by order book.

In one embodiment, the order book allocator 802 is operative to select one of the plurality of match engines 806 based on an availability thereof, e.g. based on a selection algorithm, such as round robin, least recently used, load balancing, etc.

In one embodiment, the allocation of access to the subset further comprises provision of a match algorithm or policy associated with the subset for the selected match engine 806 to use when an incoming order may be matched with more than one previously received but unsatisfied order. This allows different order books to utilize different match algorithms/policies independent of the match engine 226 to which they are allocated. The match algorithm may be a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof.

In one embodiment, the memory 804 further comprises a plurality of memory portions 808, e.g. cache or local memories, as described above, each associated with one of the plurality of match engines 806 and capable of storing at least the data representative of the subset of the set of previously received but unsatisfied orders. The order book allocator 802 may then be further operative to detect, e.g. via snooping or snarfing, an update to the stored data in one of the plurality of memory portions 808 by the match engine 806 associated therewith and cause the update to be available to the others of the plurality of match engines 806, e.g. write back.

In one embodiment, the system 800 further includes an implicator (not shown), such as the implicator 1102 as was described above, coupled with the memory 804, the plurality of match engines 806 and the order book allocator 802, and operative to, as described above, when a match engine 806 is unable to match the incoming order with at least one previously received but unsatisfied order for a counter transaction for the particular financial instrument of the incoming order, identify at least one previously received but unsatisfied order for a counter transaction for a financial instrument having at least one component in common with the particular financial instrument of the incoming order, and generate a synthetic, e.g. implied, order therefore and submit the synthetic order to the electronic trading system 100 or otherwise directly to the associated match engine 806.

In one embodiment, the system 800 further includes an order router 814 coupled with the plurality of match engines 806 and the order book allocator 802 and operative to route an incoming order to one of the plurality of match engines 806 based on available processing capacity of each of the plurality of match engines 806, e.g. subject to a load balancing algorithm or other allocation algorithm, the one of the plurality of match engines 806 being the same engine to which a prior incoming order for a transaction for the same financial instrument as the incoming order was routed, or a combination thereof.

Figure 10:
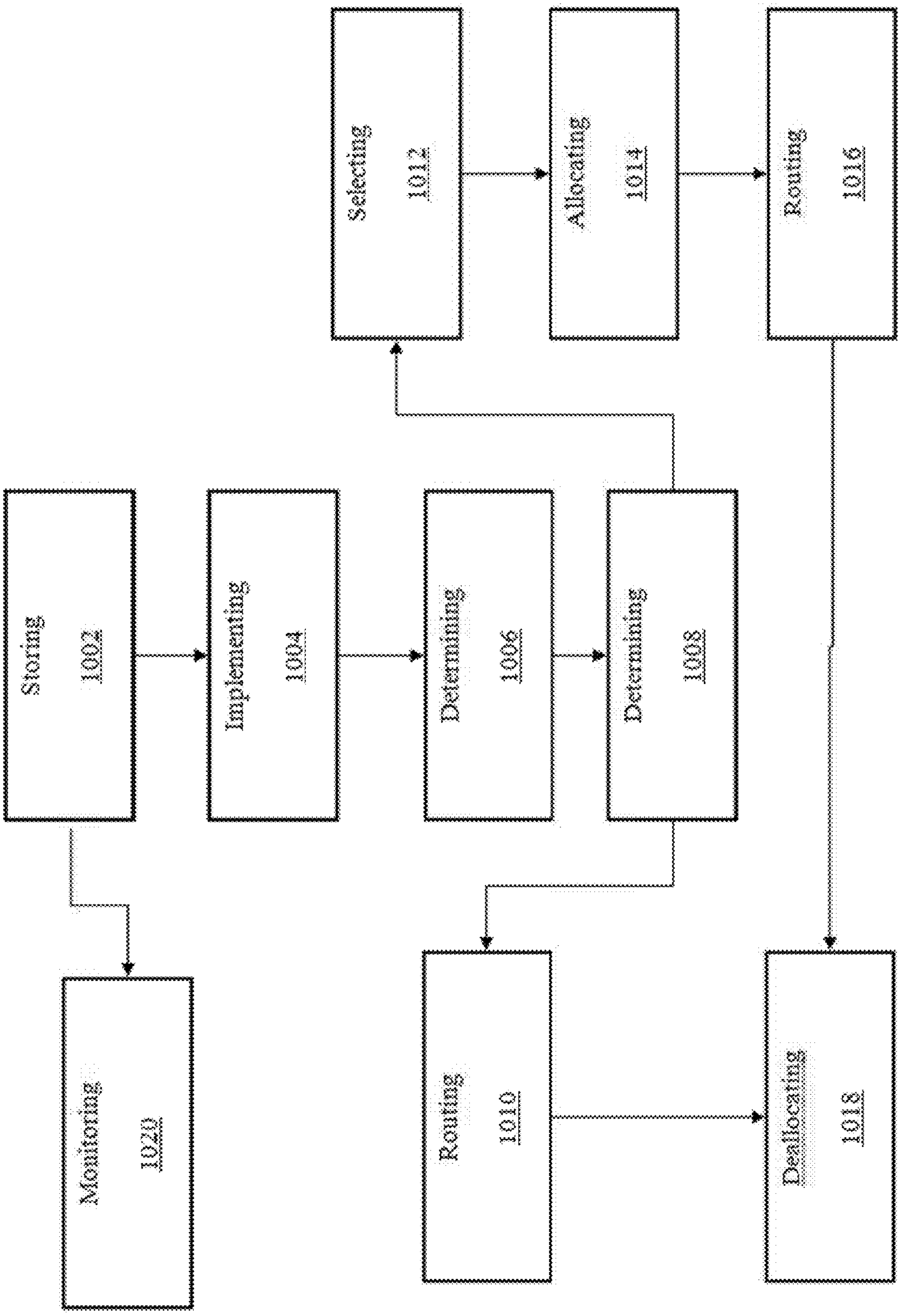
FIG. 10 depicts a flow chart showing operation of the system of FIGS. 8 and 9 according to one embodiment.

FIG. 10 depicts a flow chart 1000 showing operation of the system 800 of FIGS. 8 and 9. In particular FIG. 10 shows a computer implemented method for improving efficiency of an electronic trading system 100 for a plurality of financial instruments, each of the plurality of financial instruments, e.g. futures, options contracts, a single contract therefore or a strategy/combination of contracts, such as a spread, wherein each associated financial instrument comprises at least one component wherein, for example, for a futures or options contract, the component is the contract itself and for a strategy/combination contract having more than one component wherein the components are the leg orders/contracts/instruments thereof, as was described above. As described above, the electronic trading system 100 may include a plurality of generic match engines 806 coupled therewith, each of which may be a conventional match engine 106 which receives orders via an order entry gateway (not shown), or, as described above, may be a redundant match engine set 206 receiving orders via an orderer 210 as described above, or may be a match engine or match function having an alternative architecture. As used herein, a "match engine" 106 refers to either a conventional match engine or a redundant set of match engines as described. As will be described, each of the plurality of match engines, i.e. conventional or redundant sets, implements at least one market, or order book representative thereof, for an associated financial instrument, e.g. futures, options contracts, a single contract therefore or a strategy/combination of contracts, such as a spread, wherein each associated financial instrument comprises at least one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied.

The operation of the system 800 includes storing, such as in a memory 804, e.g. an order book memory, data representative of a set of previously received but unsatisfied orders, e.g. which may be grouped into order books, such as by product for which the order is for, each order being for a transaction, which may specify side (buy/sell), price and/or quantity, for at least one of the plurality of financial instruments (Block 1002).

The operation of the system 800, as described above, further includes implementing a plurality of match engines 806, each of the plurality of match engines may be generic, fungible or otherwise non-order/non-match-algorithm specific, and further operative to implement, as described above, at least one market, e.g. order book, for an associated a financial instrument, such as a futures or options contract, or other single contract or strategy/combination of contracts, of the plurality of financial instruments (Block 1004). Each match engine 806 being further operative to attempt to match, e.g. according to a match algorithm/policy, an incoming order provided or otherwise routed or directed thereto for a transaction, which may have been received from a market participant 204 or other source, which as described above may specify side (buy/sell), price and/or quantity, for the associated financial instrument with at least one other of the set of previously received but unsatisfied, e.g. unmatched or only partially filled, orders, the at least one other previously received but unsatisfied order being for a transaction counter thereto for a financial instrument of the plurality of financial instruments having at least one component in common with the financial instrument of the incoming order, to at least partially satisfy, e.g. fill, one or both of the incoming order or the at least one other previously received order. Each match engine 806 is then further operative to update or otherwise, e.g. to add the incoming order and/or update the stored counter order, the stored data, e.g. the order book, in the memory 804, as will be described, representative of the set of previously received but unsatisfied orders based thereon.

In one embodiment, the set of previously received but unsatisfied orders further may further include, or otherwise may be subdivided into one more financial instrument subsets, each financial instrument subset, e.g. order book, comprising those previously received orders of the set which are for a transaction for the same financial instrument of the plurality of financial instruments, wherein the order book allocator 802 is further operative to determine the subset of the set of previously received but unsatisfied orders by identifying those financial instrument subsets associated with financial instruments having at least one component thereof, e.g. are interdependent, in common with each other and the financial instrument of the incoming order. In this way all interdependent order books may be allocated to the particular selected match engine 806 which, as will be described above and further below, may facilitate implication. For example, in one embodiment, each of the plurality of match engines 806 may be further operative to attempt to identify an implied match for the incoming order among the orders of the allocated subset for financial instruments, described below, which are not identical to the financial instrument of the incoming order.

In one embodiment, each of the plurality of match engines 806 may be operative to update the stored data in the memory 804 using a back channel protocol. Alternatively, each of the plurality of match engines 806 may be operative to update the stored data in the memory 804 using a remote direct memory access ("RDMA") protocol.

In one embodiment, the plurality of match engines 806 includes sufficient match engines 806 such that a match engine 806 is always available to have routed thereto an incoming order associated with an unallocated subset of the set of previously received but unsatisfied orders.

The operation of the system 800 further includes determining a subset of the set of previously received but unsatisfied orders each having at least one component of the associated financial instrument in common with the financial instrument of the incoming order (Block 1006), and determining if access to the subset has been previously allocated, e.g. accorded, provided or otherwise granted, to one of the plurality of match engines 806 (Block 1008), which may imply that the incoming order is related to a prior order which is still undergoing the match process, and, where access to the subset has been previously allocated to one of the plurality of match engines 806, routing, or otherwise providing, the incoming order thereto for a match attempt thereby (Block 1010), and wherein access to the subset has not been allocated to one of the match engines 806, selecting one of the plurality of match engines 806 (Block 1012), allocating access to the subset to the selected match engine 806 (Block 1014) and routing the incoming order to the selected match engine 806 for a match attempt thereby (Block 1016). In one embodiment, the allocation of the subset may include transferring at least a copy of the subset to a memory 808, e.g. a cache or other local memory, associated with the selected match engine 806.

In one embodiment, facilitation of access to the subset may be implemented by providing the data representative thereof to the particular match engine 806 for use thereby and retrieving the data representative of the subset from the match engine 806 subsequent to the updating thereby.

In one embodiment, the operation of the system 800 further includes deallocating access to the subset when the selected match engine 806 has completed the attempt to match all incoming orders routed thereto prior to another incoming order being routed thereto (Block 1018).

In one embodiment, the operation of the system 800 may further include maintaining a data structure or database 812, which may be a sparse matrix or array, which stores data representative of which financial instruments of the plurality of financial instruments have at least one component thereof in common with another of the financial instruments of the plurality of financial instruments, which financial instruments, and thereby which order books, are interdependent (Block 1020). This data structure 812 may further store the locations in the memory 804 in which each of the set of previously received but unsatisfied orders is stored, which as described above, may be subdivided, logically and/or physically, by order book.

In one embodiment, the selection of one of the plurality of match engines 806 may be based on an availability thereof, e.g. based on a selection algorithm, such as round robin, least recently used, load balancing, etc.

In one embodiment, the allocation of access to the subset further comprises provision of a match algorithm or policy associated with the subset for the selected match engine 806 to use when an incoming order may be matched with more than one previously received but unsatisfied order. This allows different order books to utilize different match algorithms/policies independent of the match engine 226 to which they are allocated. The match algorithm may be a pro-rata algorithm, a first in first out ("FIFO") algorithm, a Price Explicit Time algorithm, an Order Level Pro Rata algorithm, an Order Level Priority Pro Rata algorithm, a Preference Price Explicit Time algorithm, a Preference Order Level Pro Rata algorithm, a Preference Order Level Priority Pro Rata algorithm, a Threshold Pro-Rata algorithm, a Priority Threshold Pro-Rata algorithm, a Preference Threshold Pro-Rata algorithm, a Priority Preference Threshold Pro-Rata algorithm, a Split Price-Time Pro-Rata algorithm, or combinations thereof.

One skilled in the art will appreciate that one or more functions/modules described herein may be implemented using, among other things, a logic component such as a reconfigurable logic component, e.g. an FPGA, which may include a logical processing portion coupled with a memory portion, or as a tangible computer-readable medium comprising computer-executable instructions (e.g., executable software code) executable by a processor coupled therewith to implement the function(s). Alternatively, functions/modules may be implemented as software code, firmware code, hardware, and/or a combination of the aforementioned. For example the functions/modules may be embodied as part of an electronic trading system 100 for financial instruments.

Figure 11:
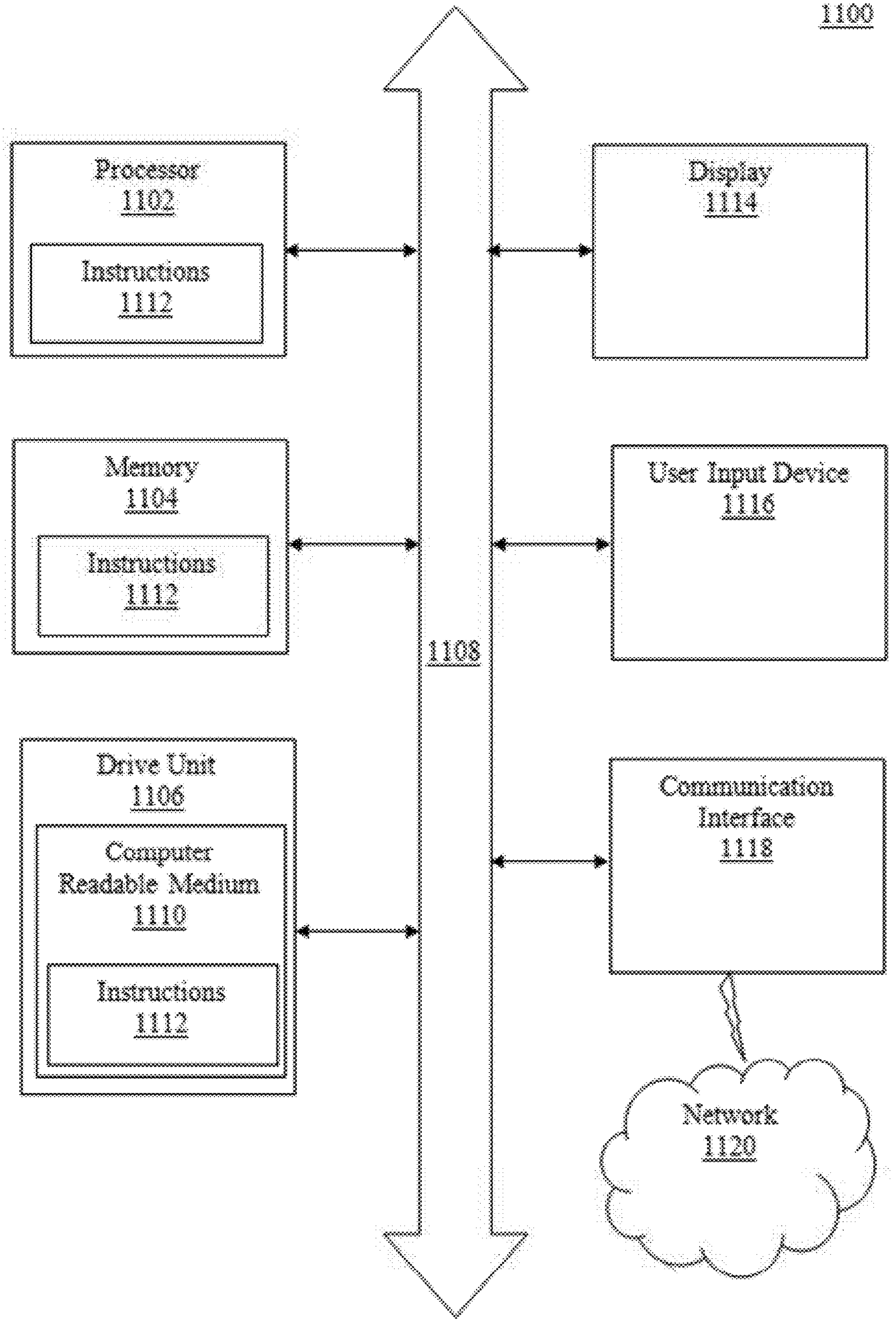
FIG. 11 shows an illustrative embodiment of a general computer system for use with the disclosed embodiments.

Referring to FIG. 11, an illustrative embodiment of a general computer system 1100 is shown. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices. Any of the components of the electronic trading system 100 discussed above may be a computer system 1100 or a component in the computer system 1100. The computer system 1100 may implement a match engine, margin processing, payment or clearing function on behalf of an exchange, such as the Chicago Mercantile Exchange, of which the disclosed embodiments are a component thereof.

In a networked deployment, the computer system 1100 may operate in the capacity of a server or as a client user computer in a client-server user network environment, as a peer computer system in a peer-to-peer (or distributed) network environment, or as a network device such as a switch, gateway or router. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1104 may be a memory component of a reconfigurable logic device, e.g. an FPGA. In one embodiment, the memory 1104 includes a cache or random access memory for the processor 1102. In alternative embodiments, the memory 1104 is separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described herein may be performed by the programmed processor 1102 executing the instructions 1112 stored in the memory 1104. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1100 may further include a display unit 1114, such as a liquid crystal display (LCD), an organic light emitting diode (OLED), a flat panel display, a solid state display, a cathode ray tube (CRT), a projector, a printer or other now known or later developed display device for outputting determined information. The display 1114 may act as an interface for the user to see the functioning of the processor 1102, or specifically as an interface with the software stored in the memory 1104 or in the drive unit 1106.

Additionally, the computer system 1100 may include an input device 1116 configured to allow a user to interact with any of the components of system 1100. The input device 1116 may be a number pad, a keyboard, or a cursor control device, such as a mouse, or a joystick, touch screen display, remote control or any other device operative to interact with the system 1100.

In a particular embodiment, as depicted in FIG. 11, the computer system 1100 may also include a disk or optical drive unit 1106. The disk drive unit 1106 may include a computer-readable medium 1110 in which one or more sets of instructions 1112, e.g. software, can be embedded. Further, the instructions 1112 may embody one or more of the methods or logic as described herein. In a particular embodiment, the instructions 1112 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium that includes instructions 1112 or receives and executes instructions 1112 responsive to a propagated signal, so that a device connected to a network 1120 can communicate voice, video, audio, images or any other data over the network 1120. Further, the instructions 1112 may be transmitted or received over the network 1120 via a communication interface 1118. The communication interface 1118 may be a part of the processor 1102 or may be a separate component. The communication interface 1118 may be created in software or may be a physical connection in hardware. The communication interface 1118 is configured to connect with a network 1120, external media, the display 1114, or any other components in system 1100, or combinations thereof. The connection with the network 1120 may be a physical connection, such as a wired Ethernet connection or may be established wirelessly as discussed below. Likewise, the additional connections with other components of the system 1100 may be physical connections or may be established wirelessly.

The network 1120 may include wired networks, wireless networks, or combinations thereof. The wireless network may be a cellular telephone network, an 802.11, 802.16, 802.20, or WiMax network. Further, the network 1120 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for coordinating administrative computer instruction execution, the computer implemented method comprising:

receiving, from a source, at a same or at different times, by each of a plurality of processors located at a same or at different locations, a plurality of administrative computer executable instructions, each associated with an instruction identifier, wherein the plurality of processors do not execute the plurality of administrative computer executable instructions upon receipt thereof, wherein each of the plurality of processors is configured to execute the administrative computer executable instructions only upon subsequent separate receipt of a corresponding instruction identifier;

storing, by each of the plurality of processors, each of the plurality of administrative computer executable instructions and their associated instruction identifiers in a respective instruction memory coupled therewith;

receiving, separately, from the administrative computer executable instructions, by each of the plurality of processors, from another source, at a same or at different times, subsequent to the storing, a plurality of data messages, each corresponding to a data message type comprising one of:

a transaction data message type comprising data indicative of a transaction; or an instruction identifier data message type comprising data indicative of the instruction identifier; and processing, by each of the plurality of processors, each of the plurality of data messages based on the corresponding data message type, wherein, for a data message corresponding to the instruction identifier data message type, the processing further comprising:

retrieving, by the processor in receipt of the data message, from the respective instruction memory, an administrative computer executable instruction associated with the instruction identifier corresponding to the data message; and executing, by the processor in receipt of the data message, the retrieved administrative computer executable instruction, wherein the execution of the retrieved administrative computer executable instruction is coordinated with respect to the receipt of the data message even when the data message is not received by each of the plurality of processors at the same time.

2. The computer implemented method of claim 1, wherein subsequent to the executing of the administrative computer executable instruction by one of the plurality of processors, the one of the plurality of processors is in a first state, and subsequent to the execution of the administrative computer executable instruction by another of the plurality of processors, the other of the plurality of processors is in a second state identical to the first state.

3. The computer implemented method of claim 1, wherein based on the execution of the administrative computer executable instruction by one of the plurality of processors, the one of the plurality of processors generates a first result and based on the execution of the administrative computer executable instruction by another of the plurality of processors, the other of the plurality of processors generates a second result identical to the first result.

4. The computer implemented method of claim 1, wherein the instruction identifier comprises a time signal indicative of a time at which each of the plurality of processors are to execute the associated administrative computer executable instruction.

5. The computer implemented method of claim 1, wherein, for a data message corresponding to the transaction data message type, the processing further comprises:

processing, by each of the plurality of processors, the data message upon receipt thereof, wherein when, subsequent thereto, a data message of the instruction identifier data message type is received and prior to a subsequently received data message of the transaction data message type, the processing of the data message of the instruction identifier data message type occurs subsequent to the processing of the data message of the transaction data message type and prior to processing of the subsequently received data message of the transaction data message type, regardless of when the data messages of the transaction data message type are received.

6. The computer implemented method of claim 1, wherein the source comprises an administrative instruction generator and the other source comprises a transaction receiver coupled with the administrative instruction generator, the method further comprising:

generating, by the administrative instruction generator, each of the plurality of administrative computer executable instructions and their associated instruction identifiers;

receiving, by the transaction receiver, each of the plurality of administrative computer executable instructions and their associated instruction identifiers from the administrative instruction generator; and augmenting, by the transaction receiver, each received instruction identifier of each associated administrative computer executable instruction with a corresponding sequence data indicative of a relationship between each received instruction identifier and any instruction identifier previously received by the transaction receiver.

7. The computer implemented method of claim 6, wherein the executing comprises executing the retrieved administrative computer executable instruction in accordance with the corresponding sequence data.

8. The computer implemented method of claim 6, further comprising:

receiving, by the transaction receiver, a plurality of data messages of the transaction data message type from a plurality of participant computers; and augmenting, by the transaction receiver, each received data message with sequence data indicative of a relationship between each received data message and any other of the plurality of data messages previously received by the transaction receiver.

9. The computer implemented method of claim 1, further comprising modifying at least one of a physical configuration or a functional configuration of each of the plurality of processors based upon the execution of the administrative computer executable instruction.

10. The computer implemented method of claim 1, wherein the executing of the retrieved administrative computer executable instruction further comprises:

causing performance of at least one of: garbage collection; update software; update data stored in the respective memory for use by the processor; enable the processing of data messages; or disable the processing of data messages.

11. The computer implemented method of claim 1, wherein the retrieved administrative computer executable instruction is of a first size and the instruction identifier associated with the retrieved administrative computer executable instruction is of a second size smaller than the first size.

12. The computer implemented method of claim 1, wherein one of the plurality of processors is optimized to execute the instruction identifier data message type and another of the plurality of processors is optimized to process the transaction data message type.

13. A computer system for coordinating administrative computer instruction execution, the computer system comprising:

a plurality of processors, located at a same or at different locations, each operative to:

receive, separately, from the administrative computer executable instructions, from a source, at a same or at different times, a plurality of administrative computer executable instructions, each associated with an instruction identifier, wherein each of the plurality of processors does not execute the plurality of administrative computer executable instructions upon receipt thereof, wherein each of the plurality of processors is configured to execute the administrative computer executable instructions only upon subsequent separate receipt of a corresponding instruction identifier;

store each of the plurality of administrative computer executable instructions and their associated instruction identifiers in a respective instruction memory coupled therewith;

receive, from another source, at a same or at different times, subsequent to the storing, a plurality of data messages, each corresponding to a data message type comprising one of:

a transaction data message type comprising data indicative of a transaction; or an instruction identifier data message type comprising data indicative of the instruction identifier; and process each of the plurality of data messages based on the corresponding data message type, wherein, for a data message corresponding to the instruction identifier data message type, the processor in receipt of the data message is further configured to:

retrieve from the respective instruction memory, an administrative computer executable instruction associated with the instruction identifier corresponding to the data message; and execute the retrieved administrative computer executable instruction, wherein the execution of the retrieved administrative computer executable instruction is coordinated with respect to the receipt of the data message even when the data message is not received by each of the plurality of processors at the same time.

14. The computer system of claim 13, wherein subsequent to the execution of the administrative computer executable instruction by one of the plurality of processors, the one of the plurality of processors is in a first state, and subsequent to the execution of the administrative computer executable instruction by another of the plurality of processors, the other of the plurality of processors is in a second state identical to the first state.

15. The computer system of claim 13, wherein based on the execution of the administrative computer executable instruction by one of the plurality of processors, the one of the plurality of processors generates a first result, and based on the execution of the administrative computer executable instruction by another of the plurality of processors, the other of the plurality of processors generates a second result identical to the first result.

16. The computer system of claim 13, wherein the instruction identifier comprises a time signal indicative of a time at which each of the plurality of processors are to execute the associated administrative computer executable instruction.

17. The computer system of claim 13, wherein, for a data message corresponding to the transaction data message type, each of the plurality of processors is further configured to:

process the data message upon receipt thereof, wherein when, subsequent thereto, a data message of the instruction identifier data message type is received and prior to a subsequently received data message of the transaction data message type, the processing of the data message of the instruction identifier data message type occurs subsequent to the processing of the data message of the transaction data message type and prior to processing of the subsequently received data message of the transaction data message type, regardless of when the data messages of the transaction data message type are received.

18. The computer system of claim 13, wherein the source comprises an administrative instruction generator and the other source comprises a transaction receiver coupled with the administrative instruction generator, wherein the administrative instruction generator is configured to generate each of the plurality of administrative computer executable instructions and their associated instruction identifiers, and wherein the transaction receiver is configured to:

receive each of the plurality of administrative computer executable instructions and their associated instruction identifiers from the administrative instruction generator; and augment each received instruction identifier of each associated administrative computer executable instruction with a corresponding sequence data indicative of a relationship between each received instruction identifier and any instruction identifier previously received by the transaction receiver.

19. The computer system of claim 18, wherein each of the plurality of processors is further configured to execute the retrieved administrative computer executable instruction in accordance with the corresponding sequence data.

20. The computer system of claim 18, wherein the transaction receiver is further configured to:

receive a plurality of data messages of the transaction data message type from a plurality of participant computers; and augment each received data message with sequence data indicative of a relationship between each received data message and any other of the plurality of data messages previously received by the transaction receiver.

21. The computer system of claim 13, wherein the execution of the administrative computer executable instruction causes a modification of at least one of a physical configuration or a functional configuration of each of the plurality of processors.

22. The computer system of claim 13, wherein the execution of the retrieved administrative computer executable instruction causes performance of at least one of: garbage collection; update software; update data stored in the respective memory for use by the processor; enable the processing of data messages; or disable the processing of data messages.

23. The computer system of claim 13, wherein the retrieved administrative computer executable instruction is of a first size and the instruction identifier associated with the retrieved administrative computer executable instruction is of a second size smaller than the first size.

24. The computer system of claim 13, wherein one of the plurality of processors is optimized to execute the instruction identifier data message type and another of the plurality of processors is optimized to process the transaction data message type.

25. A computer system for coordinating computer instruction execution, the computer system comprising:

means for receiving, from a source, at a same or at different times, a plurality of administrative computer executable instructions, each associated with an instruction identifier, wherein the plurality of administrative computer executable instructions are not executed upon receipt thereof;

means for storing, each of the plurality of administrative computer executable instructions and their associated instruction identifiers in a respective instruction memory coupled therewith;

means for receiving, separately, from the administrative computer executable instructions, from another source, at a same or at different times, subsequent to the storing, a plurality of data messages, each corresponding to a data message type comprising one of:

a transaction data message type comprising data indicative of a transaction; or an instruction identifier data message type comprising data indicative of an instruction identifier; and means for processing, each of the plurality of data messages based on the corresponding data message type, wherein, for a data message corresponding to the instruction identifier data message type, the means for processing further comprising:

means for retrieving, from the respective instruction memory, an administrative computer executable instruction associated with the instruction identifier corresponding to data message; and means for executing, the retrieved administrative computer executable instruction, wherein the execution of the retrieved administrative computer executable instruction is coordinated with respect to the receipt of the data message even when the data message is not received at the same time.

* * * * *